US012682499B2

(12) United States Patent
Bove, jr. et al.

(10) Patent No.: US 12,682,499 B2
(45) Date of Patent: Jul. 14, 2026

(54) OPTIMIZED LIGHT FIELD REPRESENTATION FOR COMPRESSION

(71) Applicant: Adeia Guides Inc., San Jose, CA (US)

(72) Inventors: V. Michael Bove, jr., Wrentham, MA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 772 days.

(21) Appl. No.: 17/966,187

(22) Filed: Oct. 14, 2022

(65) Prior Publication Data

US 2024/0127484 A1 Apr. 18, 2024

(51) Int. Cl.
*G06T 9/00* (2006.01)
*G06T 3/40* (2024.01)

(52) U.S. Cl.
CPC . *G06T 9/00* (2013.01); *G06T 3/40* (2013.01)

(58) Field of Classification Search
CPC ................................... G06T 9/00; G06T 3/40
USPC ........................................................ 382/232
See application file for complete search history.

(56) References Cited

U.S. PATENT DOCUMENTS

| | | | |
|---|---|---|---|
| 9,384,424 B2 | 7/2016 | Grefalda et al. | |
| 2008/0317115 A1* | 12/2008 | Kitahara | H04N 19/177 |
| | | | 375/E7.129 |
| 2015/0199793 A1* | 7/2015 | Venkataraman | H04N 19/625 |
| | | | 382/239 |

| | | | |
|---|---|---|---|
| 2018/0352254 A1* | 12/2018 | Alpaslan | H04N 13/232 |
| 2020/0380765 A1* | 12/2020 | Thudor | G06T 9/00 |
| 2021/0127138 A1* | 4/2021 | Sullivan | H04N 19/172 |
| 2021/0176482 A1* | 6/2021 | Makeev | H04N 19/436 |
| 2023/0067994 A1* | 3/2023 | Ansorregui Lobete | G06T 9/00 |
| 2023/0300426 A1* | 9/2023 | Atluru | H04N 21/816 |
| | | | 725/146 |

OTHER PUBLICATIONS

H. Schwarz, D. Marpe and T. Wiegand, "Analysis of Hierarchical B Pictures and MCTF," 2006 IEEE International Conference on Multimedia and Expo, Toronto, ON, Canada, 2006, pp. 1929-1932, doi: 10.1109/ICME.2006.262934. (Year: 2006).*
E. Cornwell, L. Li, Z. Li and Y. Sun, "An efficient compression scheme for the multi-camera light field image, " 2017 IEEE 19th International Workshop on Multimedia Signal Processing (MMSP), Luton, UK, 2017, pp. 1-6, doi: 10.1109/MMSP.2017.8122243. (Year: 2017).*
Conti et al., "Dense Light Field Coding: A Survey," IEEE Access, 8:49244-49284 (2020).

(Continued)

*Primary Examiner* — Chineyere Wills-Burns
(74) *Attorney, Agent, or Firm* — HG LAW LLP

(57) ABSTRACT

Systems, methods and apparatuses are described herein for encoding image data comprising two-dimensional (2D) perspective images that exhibit parallax for presentation on a three-dimensional (3D) display. The image data may be accessed and encoded by generating a group of pictures (GOP) that comprises the 2D perspective images and ordering the 2D perspective images within the GOP in a particular order based on a set of evaluated metrics derived from content of the plurality of 2D perspective images or based on characteristics associated with equipment used to capture the plurality of 2D perspective images. The encoded image data may be transmitted for display.

19 Claims, 10 Drawing Sheets

(56) References Cited

OTHER PUBLICATIONS

Khoury et al., "A New Prediction Structure for Efficient MV-HEVC based Light Field Video Compression," 2019 International Conference on Computing, Networking and Communications (ICNC), pp. 588-591 (2019).
Li et al, "Pseudo sequence based 2-D hierarchical coding structure for light-field image compression," IEEE Journal of Selected Topics on Signal Processing, 11(7):1107-1119 (2017).

* cited by examiner (a)

| Display order | 0 | 1 | 2 | 3 | 4 | 5 | 6 | 7 | 8 | 9 | 10 | 11 | 12 | 13 | 14 | 15 |
| Encoding order | 0 | 5 | 4 | 6 | 3 | 8 | 7 | 9 | 2 | 12 | 11 | 13 | 10 | 15 | 14 | 1 |

Example of hierarchical coding structure for a GOP of 16 pictures.

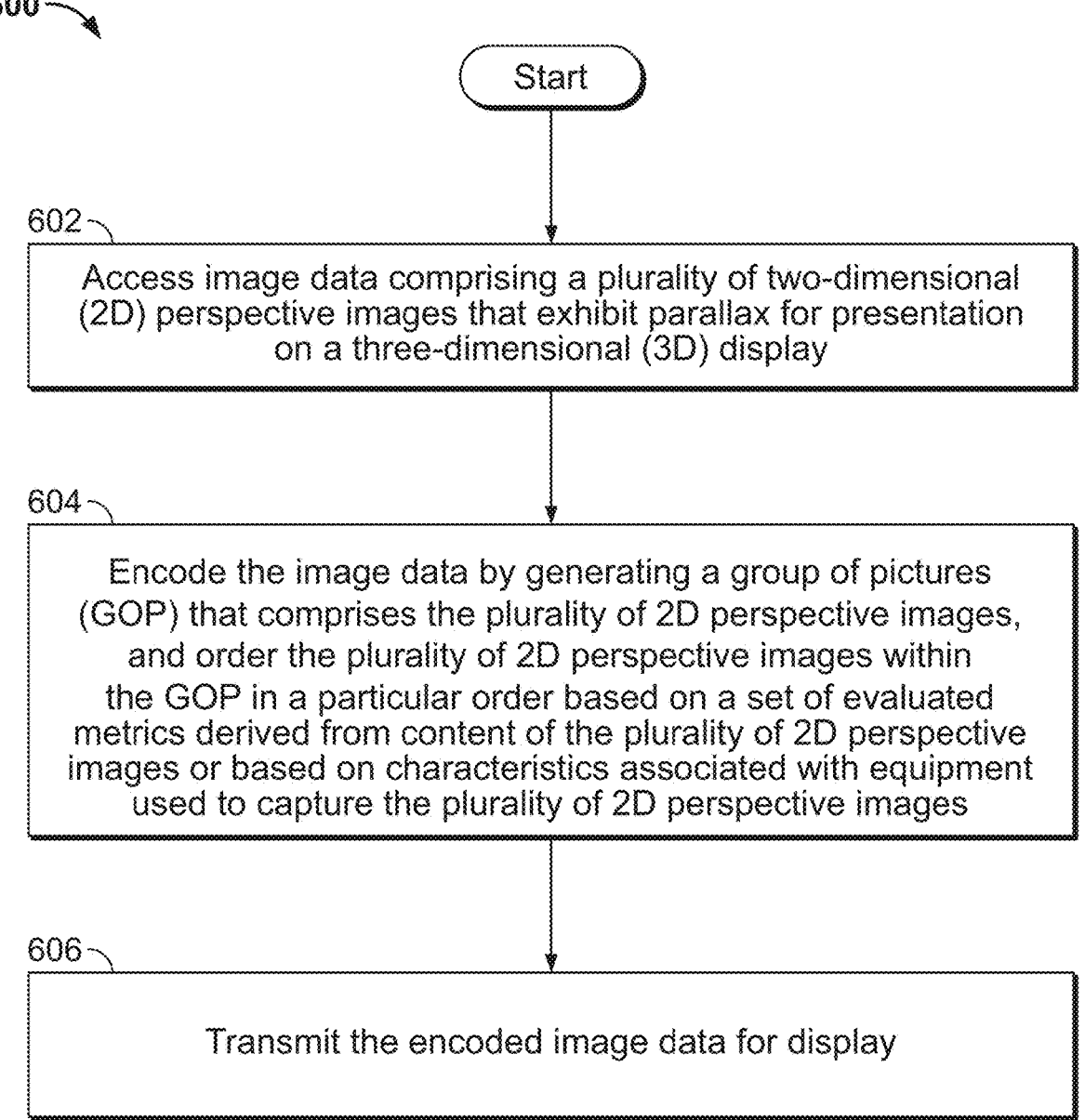

600

Start

602

Access image data comprising a plurality of two-dimensional (2D) perspective images that exhibit parallax for presentation on a three-dimensional (3D) display

604

Encode the image data by generating a group of pictures (GOP) that comprises the plurality of 2D perspective images, and order the plurality of 2D perspective images within the GOP in a particular order based on a set of evaluated metrics derived from content of the plurality of 2D perspective images or based on characteristics associated with equipment used to capture the plurality of 2D perspective images

606

Transmit the encoded image data for display

FIG. 6

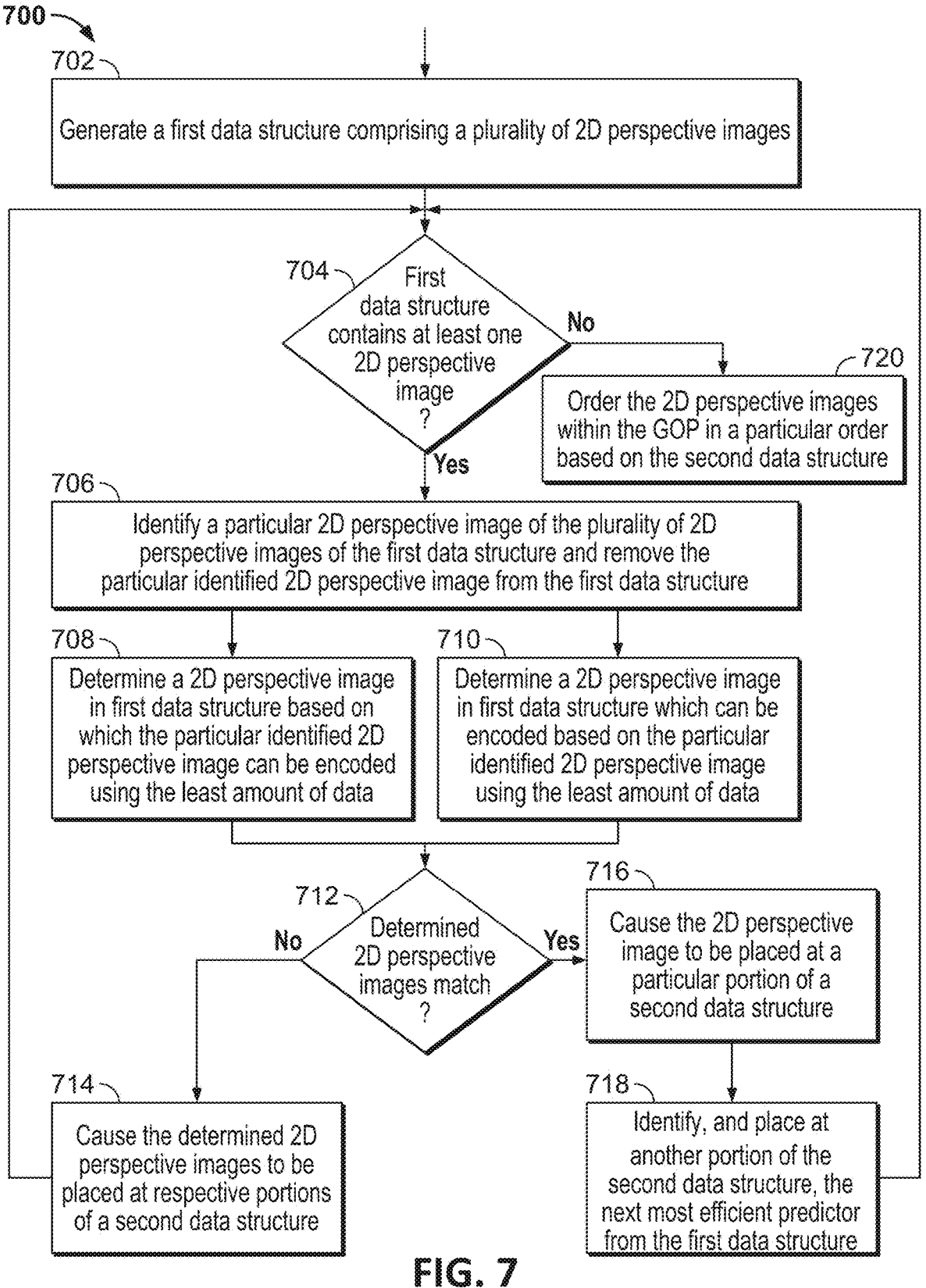

700

702
Generate a first data structure comprising a plurality of 2D perspective images 704
First data structure contains at least one 2D perspective image ?

No

720
Order the 2D perspective images within the GOP in a particular order based on the second data structure Yes 706
Identify a particular 2D perspective image of the plurality of 2D perspective images of the first data structure and remove the particular identified 2D perspective image from the first data structure 708
Determine a 2D perspective image in first data structure based on which the particular identified 2D perspective image can be encoded using the least amount of data 710
Determine a 2D perspective image in first data structure which can be encoded based on the particular identified 2D perspective image using the least amount of data 712
Determined 2D perspective images match ?

No

Yes

716
Cause the 2D perspective image to be placed at a particular portion of a second data structure 714
Cause the determined 2D perspective images to be placed at respective portions of a second data structure 718
Identify, and place at another portion of the second data structure, the next most efficient predictor from the first data structure

FIG. 7

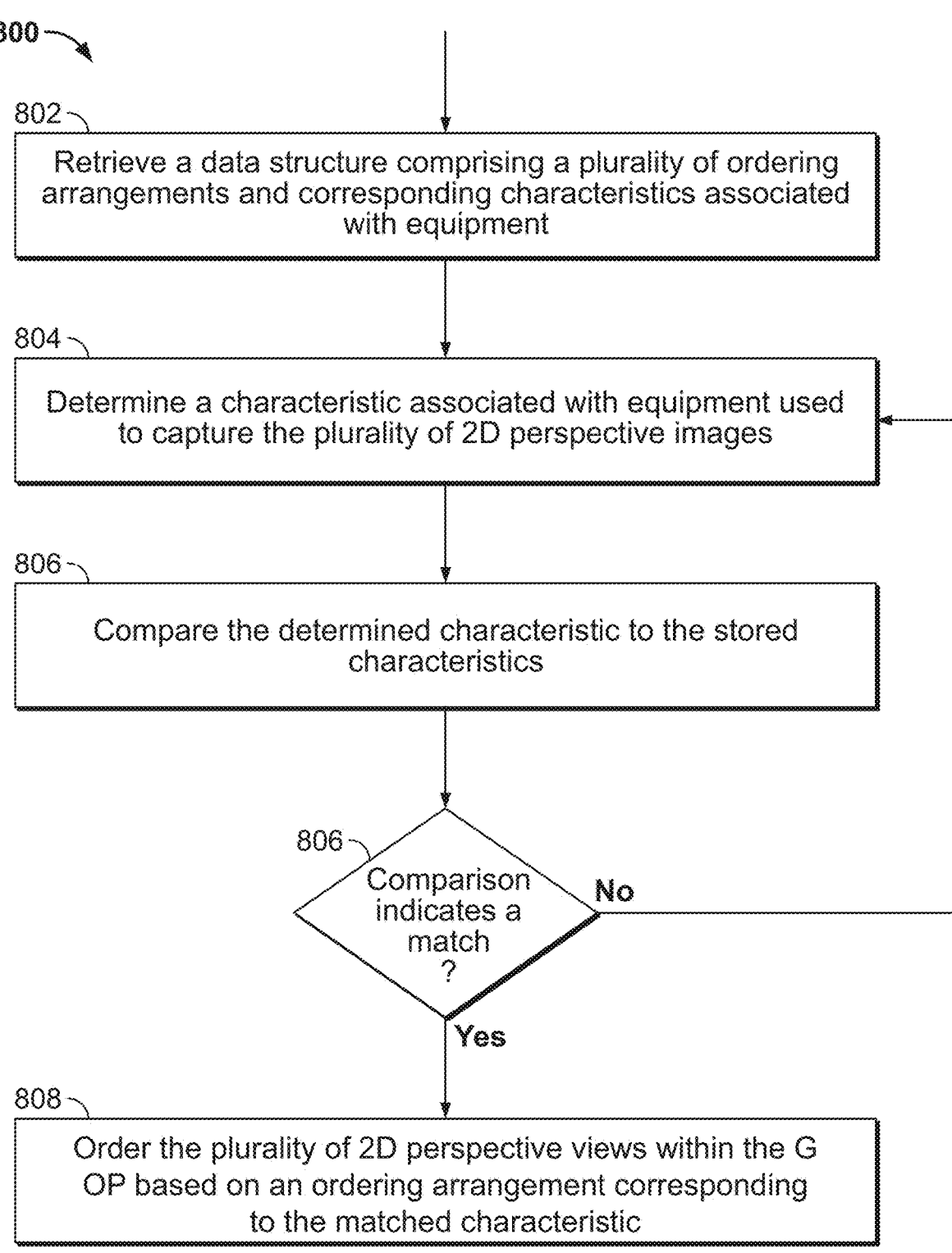

800

802
Retrieve a data structure comprising a plurality of ordering arrangements and corresponding characteristics associated with equipment 804
Determine a characteristic associated with equipment used to capture the plurality of 2D perspective images 806
Compare the determined characteristic to the stored characteristics 806
Comparison indicates a match ?

No

Yes

808
Order the plurality of 2D perspective views within the G OP based on an ordering arrangement corresponding to the matched characteristic

FIG. 8

OPTIMIZED LIGHT FIELD REPRESENTATION FOR COMPRESSION

BACKGROUND

This disclosure is directed to systems and methods for encoding image data comprising two-dimensional (2D) perspective images that exhibit parallax for presentation on a three-dimensional (3D) display. In particular, techniques are disclosed for encoding the image data by generating a group of pictures (GOP) comprising the 2D perspective images and optimally ordering the 2D perspective images within the GOP.

SUMMARY

With recent advances in display technology, image sensor technology and computation, particularly graphics processing units (GPUs), as well as increasing interest in immersive virtual experiences, the long-pursued concept of light field (LF) displays is becoming a more active area of commercial development. LF imagery represents a scene as a collection of observations of the scene from different camera positions, often referred to as elemental images or perspective images or parallax views. While such imagery is sometimes captured with a single image sensor and a lenslet array (as in the Lytro camera), larger scenes are more commonly captured with a 2D camera array.

LF is a three-dimensional (3D) capture solution that directly records four-dimensional (4D) plenoptic visual signals for immersive visual communication and interaction. Due to the highly redundant nature of LF data, the data volume generated is extremely large (e.g., including many high-resolution views) for storage and communication of the light field data.

In one approach for compressing LF data, existing 2D video compression standards are used to create a group of pictures (GOP) of a "pseudosequence" of perspective images taken at the same time, ordered in a predetermined viewpoint sequence such as from top left to bottom right, or spiraling outward from the centermost viewpoint. An example of a pseudosequence for encoding nine 2D perspective images $1p_1$-$1p_9$ is shown below:

| | | |
|---|---|---|
| $1p_1$ | $1p_2$ | $1p_3$ |
| $1p_6$ | $1p_5$ | $1p_4$ |
| $1p_7$ | $1p_8$ | $1p_9$ |

Using such an approach, due to the highly correlated nature of the perspective images, predictive coding may be employed, and decoding results in a video sequence where a given perspective image occurs every n frames, where n is the number of views. However, such an approach fails to find an optimal ordering for the perspective images, which may vary depending on the spatial arrangement and angular orientations of cameras or microlenses used to capture the perspective images, the scene being imaged, and/or other factors.

In another approach, multidimensional prediction structures for light field images have been employed. However, the pseudosequence approach offers advantages of relative computational simplicity and compatibility with widely available hardware and software optimizations used in ordinary 2D video encoding and decoding applications likely to be widely used for some time.

To overcome these problems, systems, methods and apparatuses are provided herein for determining an order for 2D perspective images, to be encoded as a GOP, in a manner that optimizes the efficiency of encoding or compressing such perspective images, where such perspective images may be provided by an LF camera system or other camera array application, and may be presented via a 3D display. Implementing any of the one or more of the techniques described herein, a system or systems may be configured to access image data, wherein the image data comprises a plurality of 2D perspective images that exhibit parallax for presentation on a 3D display. The system(s) may be configured to encode the image data by generating a GOP that comprises the plurality of 2D perspective images, ordering the plurality of 2D perspective images within the GOP in a particular order based on a set of evaluated metrics derived from content of the plurality of 2D perspective images or based on characteristics associated with equipment used to capture the plurality of 2D perspective images. The system(s) may be configured to transmit the encoded image data for display and/or otherwise store or maintain the encoded image data.

Such aspects may enable the provided systems and methods to optimally order 2D perspective images within a GOP based at least in part on coding efficiency (e.g., to dynamically adapt to content of a captured scene), and/or based at least in part on a combination of a particular camera setup and scene, such as, for example, one or more pre-configurations determined in advance (e.g., to apply an optimization to a known arrangement of micro-sensors or multi-cameras). In some embodiments, such aspects may enable a legacy or standard-based encoding technique that exploits spatial and angular or inter-view characteristics of the 2D perspective images to be optimized. Such techniques may improve the ability to supply light field displays with compressed video streams, and may leverage certain features of existing video standards. For example, perspective images within a particular frame may have many similarities, particularly adjacent or nearby perspective image regions, which can be exploited to efficiently encode the perspective image. In some embodiments, the aspects described herein may be particularly advantageous with respect to dense multi-angle camera arrays, such as, for example, those used for the cinematic "bullet time" effect.

In some embodiments, determining the set of evaluated metrics comprises determining a prediction efficiency for each 2D perspective image of the plurality of 2D perspective images, wherein the prediction efficiency corresponds to a degree to which each 2D perspective image is usable to predict characteristics of others of the plurality of 2D perspective images.

In some embodiments, the encoded image data is transmitted to a client device configured to decode the encoded image data and generate the decoded image data for display. In some embodiments, the particular order of the plurality of 2D perspective images within the GOP enables the image data to be transmitted to the client such that visual quality of the displayed decoded image data is maximized for a given data rate of transmitting the image data. In some embodiments, the particular order of the plurality of 2D perspective images within the GOP enables the image data to be transmitted to the client such that a data rate of transmitting the image data is minimized for a given visual quality of the displayed decoded image data.

In some embodiments, the ordering comprises identifying a first 2D perspective image of the plurality of 2D perspective images, wherein a first data structure comprises the plurality of 2D perspective images, and modifying the first data structure by removing the first 2D perspective image from the first data structure. The ordering may further comprise determining a second 2D perspective image of the 2D perspective images included in the modified first data structure, based on which the first 2D perspective image can be encoded using the least amount of data; and generating a second data structure comprising the first 2D perspective image and the second 2D perspective image, wherein ordering the plurality of 2D perspective images within the GOP is based on the second data structure.

In some embodiments, the ordering further comprises determining a third 2D perspective image, of the 2D perspective images included in the modified first data structure, that can be encoded based on the first 2D perspective image using the least amount of data; and generating a second data structure comprising the first 2D perspective image and at least one of the second 2D perspective image or the third 2D perspective image, wherein ordering the plurality of 2D perspective images within the GOP is based on the second data structure.

In some embodiments, the plurality of 2D perspective images are ordered within the GOP in the particular order based on the characteristic or characteristics associated with the equipment used to capture the plurality of 2D perspective images, the characteristic or characteristics comprising at least one of a spatial arrangement of the equipment or an angular orientation of the equipment with respect to a captured scene corresponding to the image data.

In some embodiments, the characteristics comprise a type of the equipment, and the type of the equipment comprises a multi-camera array, a camera gantry or a lenslet camera.

In some embodiments, the characteristics comprise a depth range from which a scene corresponding to the image data is captured by the equipment.

In some embodiments, the characteristics comprise a distance between the equipment and a captured scene corresponding to the image data.

In some embodiments, the system(s) described herein may be further configured to store a plurality of ordering arrangements and corresponding characteristics associated with the equipment, and perform the ordering by determining the characteristic, matching the determined characteristic to a stored characteristic, and ordering the plurality of 2D perspective images based on an ordering arrangement corresponding to the stored characteristic, wherein the ordering arrangement corresponds to the particular order.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 6 is a flowchart of a detailed illustrative process for processing image data to be transmitted to a 3D display, in accordance with some embodiments of this disclosure.

FIG. 7 is a flowchart of a detailed illustrative process for determining an ordering of 2D perspective images in a GOP, in accordance with some embodiments of this disclosure.

FIG. 8 is a flowchart of a detailed illustrative process for determining an ordering of 2D perspective images in a GOP, in accordance with some embodiments of this disclosure.

DETAILED DESCRIPTION

Figure 1A:
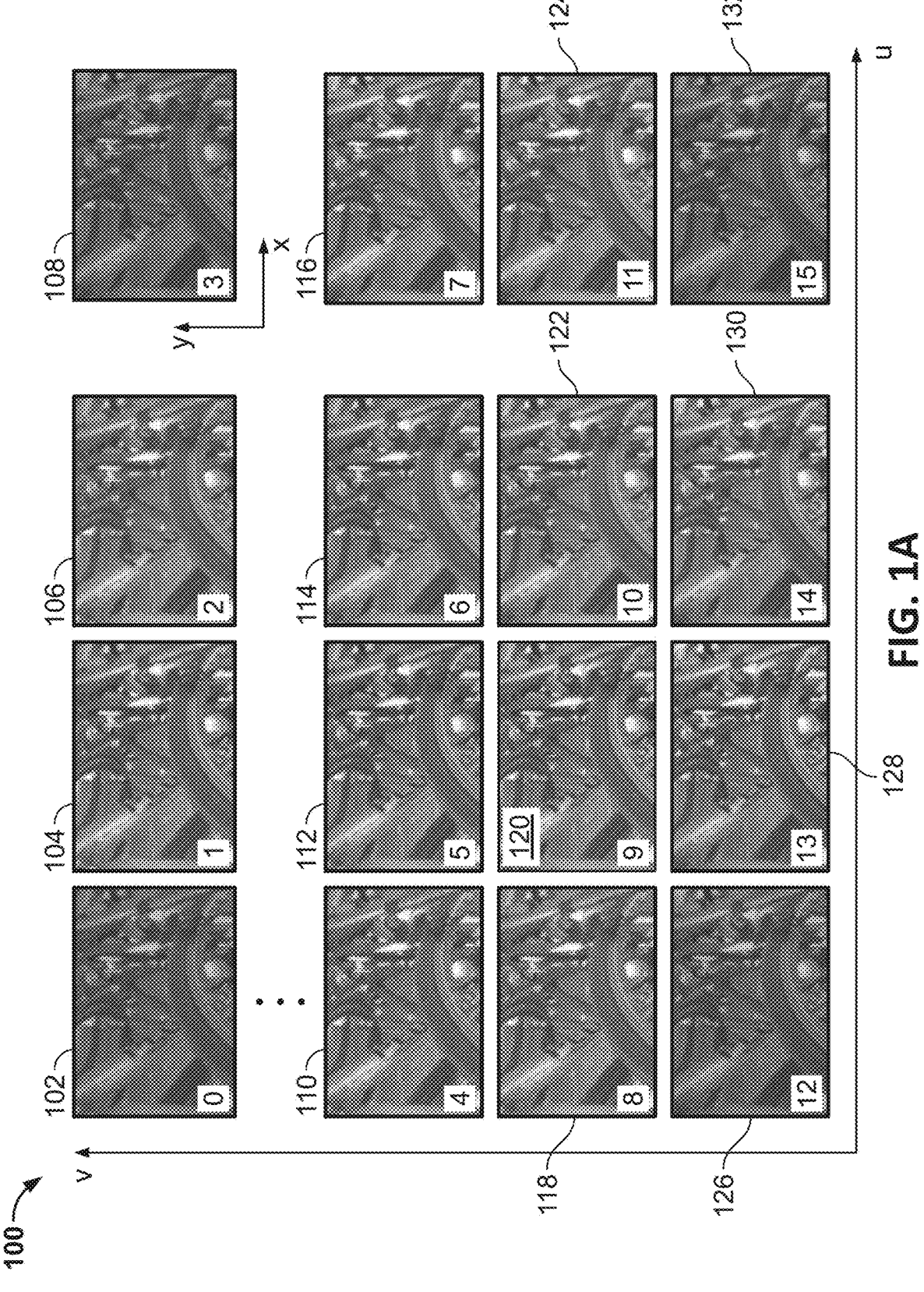
FIGS. 1A-1B show illustrative light field image data, in accordance with some embodiments of this disclosure.
Figure 1B:
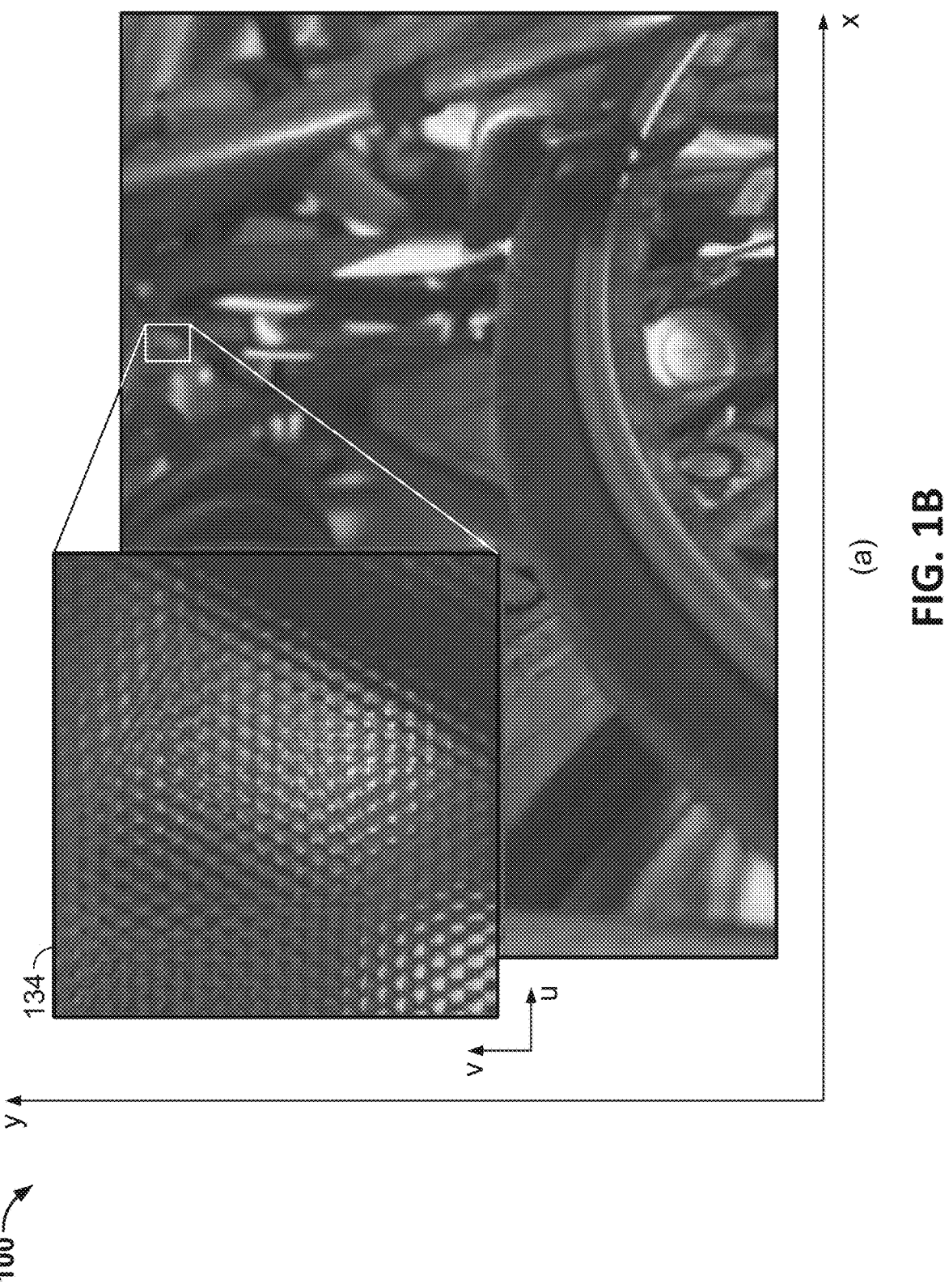

FIGS. 1A-1B show illustrative light field image data, in accordance with some embodiments of this disclosure. As shown in FIG. 1A, light field (LF) image data 100 may comprise a plurality of two-dimensional (2D) perspective images or parallax views 102, 104, 106, 108, 110, 112, 114, 116, 118, 120, 122, 124, 126, 128, 130 and 132 representing various perspectives of a three-dimensional (3D) scene (e.g., a particular real-world scene and/or computer-generated images of a particular scene). 2D perspective images 102-132 of LF image data 100 may exhibit parallax for presentation on an LF-based 3D display (or any other suitable 3D display). In some embodiments, the 3D display may be configured to display a representation of a scene as a collection of observations from different camera (or virtual camera) positions, which may be referred to as elemental images or perspective images. In some embodiments, perspective images 102-132 each correspond to a single instance in time. While LF image data 100 in the example of FIG. 1A is shown comprising 4×4 2D perspective images, it should be appreciated that LF image data 100 may comprise 8×8 2D perspective images, or any suitable number of 2D perspective images. In some embodiments, LF image data 100 may correspond to any other suitable type of 3D image data. In some embodiments, each of the 2D perspective images may correspond to, e.g., an HD video stream, 4K video stream, or any other suitable video stream or image data, or any combination thereof.

In some embodiments, such as shown in the example of FIG. 1A, the 2D perspective images 102-132 may be respectively produced by corresponding cameras in a camera array comprising 16 cameras denoted as cameras 0-15. For example, each camera may be positioned adjacent to at least two other cameras in the camera array, e.g., camera 0 corresponding to 2D perspective image 102 may be adjacent to cameras 1 and 4, camera 10 corresponding to 2D perspective image 122 may be adjacent to cameras 6, 9, 11 and 14, etc.

In some embodiments, such as shown in the example of FIG. 1B, the 2D perspective images may be derived from a 2D grid of microlens images, which may comprise a plurality of macropixels 134, e.g., induced by lenslet arrays. For example, light rays used to capture a given scene may converge on different portions of a lenslet array and diverge to corresponding portions of the image sensor for output as macropixels 134, e.g., a group of pixels. In some embodiments, at least a portion of the macropixels 134 may have a hexagonal form or any other suitable shape or any combination thereof, depending on the configuration of microlens array. In some embodiments, 2D perspective images 102-132 may be obtained by processing (e.g., teasing apart) macropixels 134 and reassembling a set of images similar to those described in FIG. 1A, to enable the techniques described herein to operate on such images.

In some embodiments, any suitable type of equipment (e.g., any of cameras 302 and/or 304 of FIG. 3) and/or sensors is employed (e.g., 3D cameras, image sensors, LiDAR sensors, infrared cameras, wearable sensors, haptic sensors, or any other suitable equipment, or any combination thereof) to capture LF image data 100. In some embodiments, a captured scene may comprise one or more objects or entities, and may be captured at a particular location (e.g., a studio or stage or other suitable environment) at which equipment for capturing LF data and generating 3D media assets is located, such as by reconstructing a digital representation of the scene from various perspectives. In some embodiments, the equipment may comprise an image sensor and a lenslet array (e.g., in the case of FIG. 1B), a 2D multi-camera array or a camera gantry (e.g., in the case of FIG. 1A), or images may be captured or generated using any other suitable electro-optic or optoelectronic mechanism, or any other suitable methodology or equipment, or any combination thereof. In some embodiments, the captured image data may additionally or alternatively correspond to a multiview rendering of synthetic content such as from a 3D model (e.g., a computer-generated imagery or CGI model) or game engine rendered with a virtual camera in an array of positions. The image data captured by the equipment may facilitate a realistic 3D viewing experience for the user using any suitable number of 2D perspective images. In some embodiments, the image sensor, e.g., a charge-coupled device (CCD) and/or a complementary metal-oxide semiconductor (CMOS), or any other suitable image sensor or suitable combination thereof, and a lenslet array and/or the 2D camera array (e.g., plenoptic content capture devices, or any other suitable content capture devices or cameras, or any combination thereof, which may each comprise internal microlens arrays and image sensors) may be configured to capture a plurality of different 2D perspective images of a scene, to enable reconstruction of the scene by a 3D display from every angle. Plenoptic content capture devices are discussed in more detail in U.S. Pat. No. 9,384,424 issued in the name of Rovi Guides, Inc. on Jul. 5, 2016, the contents of which are hereby incorporated by reference herein in their entirety.

For example, LF data comprising all light rays or photons propagating from an object to a camera may be captured. Such LF data is four-dimensional, and may be represented by a vector comprising intensity information, spatial positioning information, and directionality and angular information of light rays of the LF. In some embodiments, light rays from a particular portion of the captured scene may project to a particular portion of the lenslet array (e.g., via a main lens of the camera) and/or corresponding portions or pixels of an image sensor (e.g., positioned behind the lenslet array), thereby preserving orientation and direction information of the light rays arriving at the sensor, in addition to color and brightness information, for use in reconstructing the image data at a 3D display. In some embodiments, each pixel of the 3D display displaying the perspective images may be associated with color and brightness values, and may be configured to be perceived differently in different angular directions, e.g., left, right, up, down, etc., based on the orientation and direction information.

The LF display at which image data 100 may be displayed may be understood as a display configured to adapt to the user moving his or her head and/or his or her eyes and/or his or her body to view the LF display from different angles or vantage points (e.g., if a user physically pans from left to right, or otherwise modifies his or her viewing location, or if a user manipulates or shifts a device comprising a 3D display relative to him- or herself, or any combination thereof), and/or the LF display is otherwise shifted relative to the user (e.g., if a user manipulates or shifts a device comprising a 3D display relative to him- or herself). For example, in such instance(s), the LF display may adapt such that one or more images provided via the LF display may appear to the user to shift in perspective according to the perception angle of the new vantage point, as if the object were actually present, thus making the user perceive the image as three-dimensional. The 2D perspective images may be horizontal-perspective-only (in which the view perceived by the user only changes as the user's perspective changes from side to side), vertical-perspective-only (in which the view perceived by the user only changes as the user's perspective changes in an upwards or downwards direction), or a full perspective image (in which the view changes as the user's perspective shifts up and down and/or side to side) or any other suitable arrangement may be employed, or any combination thereof.

In some embodiments, the 3D display may be an LF display, tensor display, volumetric display, holographic display, multi-layer display, modular display, LCD display or any other suitable type of display, or any combination thereof. A modular display is discussed in more detail in commonly owned U.S. application Ser. No. 17/706,822, filed Mar. 29, 2022, the contents of which are hereby incorporated by reference herein in their entirety. A tensor display is discussed in more detail in commonly owned U.S. application Ser. No. 17/727,970, filed Apr. 25, 2022, the contents of which are hereby incorporated by reference herein in their entirety. Perspective images 102-132 may be 2D, and a plurality of the 2D perspective images may together make up a 2D perspective frame, as discussed in more detail below. The 3D display may be configured to be capable of reconstructing every possible view and perspective of the content. In some embodiments, the 3D display may be configured to display holograms or holographic structures. In some embodiments, the 3D display may be capable of providing a 3D viewing experience to the user with or without the aid of an additional device, e.g., glasses equipped with temporal shutters, polarizers, color filters, or other optical or optoelectronic elements.

In some embodiments, LF image data 100 may be used to generate a plurality of 2D perspective images for use by a 3D display to display one or more portions of a media asset, which may comprise any suitable number of frames. For example, the perspective images may correspond to a particular scene, segment, chunk or other single portion of a media asset at an instance of time. In some embodiments, the plurality of 2D perspective images may respectively correspond to different perspectives of a scene having angular differences from each other, e.g., a degree or less apart, or any other suitable degrees of separation between 2D perspective images may be employed. As referred to herein, the terms "media asset" and "content" may be understood to mean electronically consumable user assets, such as LF content, 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. In some embodiments, a 3D display may be configured to enable a user to modify the focus of different objects depicted in the media asset in a particular scene and/or while the media asset is progressing, e.g., in a foveated display. In some embodiments, each 2D perspective image may be understood as a bitmap, e.g., comprising bits representing values of brightness, color and directionality of light rays associated with the image data of the 2D perspective image.

In some embodiments, an image data processing system may perform any suitable processing or pre-processing of the image data corresponding to the light field data that is to be transmitted for display and/or stored. The image data processing system (e.g., implemented at one or more of media content source 502, server 504, database 505, or 3D display device 515 of FIG. 5, or any combination thereof, or distributed across one or more of any other suitable device, or any combination thereof) may be configured to access LF image data 100 comprising the light field information, (e.g., 2D perspective images 102-132 of FIG. 1A). The image data processing system may be configured to perform compression and/or encoding and/or bit reduction techniques on digital bits of LF image data 100. As referred to herein, compression and/or encoding may be understood as performance by any suitable combination of hardware and/or software of bit reduction techniques on digital bits of LF image data 100 in order to reduce the amount of storage space required to store LF image data 100. Such techniques may reduce the bandwidth or network resources required to transmit the at least a portion of LF image data 100 over a network or other suitable wireless or wired communication medium and/or enable bitrate savings with respect to downloading or uploading the media asset. Such techniques may encode the LF image data 100 such that the encoded LF image data 100 or encoded portion thereof may be represented with fewer digital bits than the original representation while minimizing the impact of the encoding or compression on the quality of the LF image data 100. In some embodiments, the image data processing system may employ a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

In some embodiments, the compression or encoding techniques may compress LF image data 100 by exploiting the fact that for a particular 2D perspective image, adjacent or nearby (e.g., above, below, left, right or diagonally neighboring or otherwise proximate) 2D perspective images 102-132 of FIG. 1A may have a significant amount of redundancy with respect to each other. Additionally or alternatively, such encoding techniques may compress LF image data 100 by exploiting the fact that temporally sequential or nearby 2D perspective frames of the 2D perspective images may have a significant amount of redundancy with respect to each other. In some embodiments, in performing the encoding, the image data processing system may take into account an appropriate format of the image data for a particular target device (e.g., a particular type of device and/or of a particular platform or operating system) that is to receive the data, e.g., different versions of the image data may be stored or encoded or transcoded on the fly for different types of client devices.

Figure 2A:
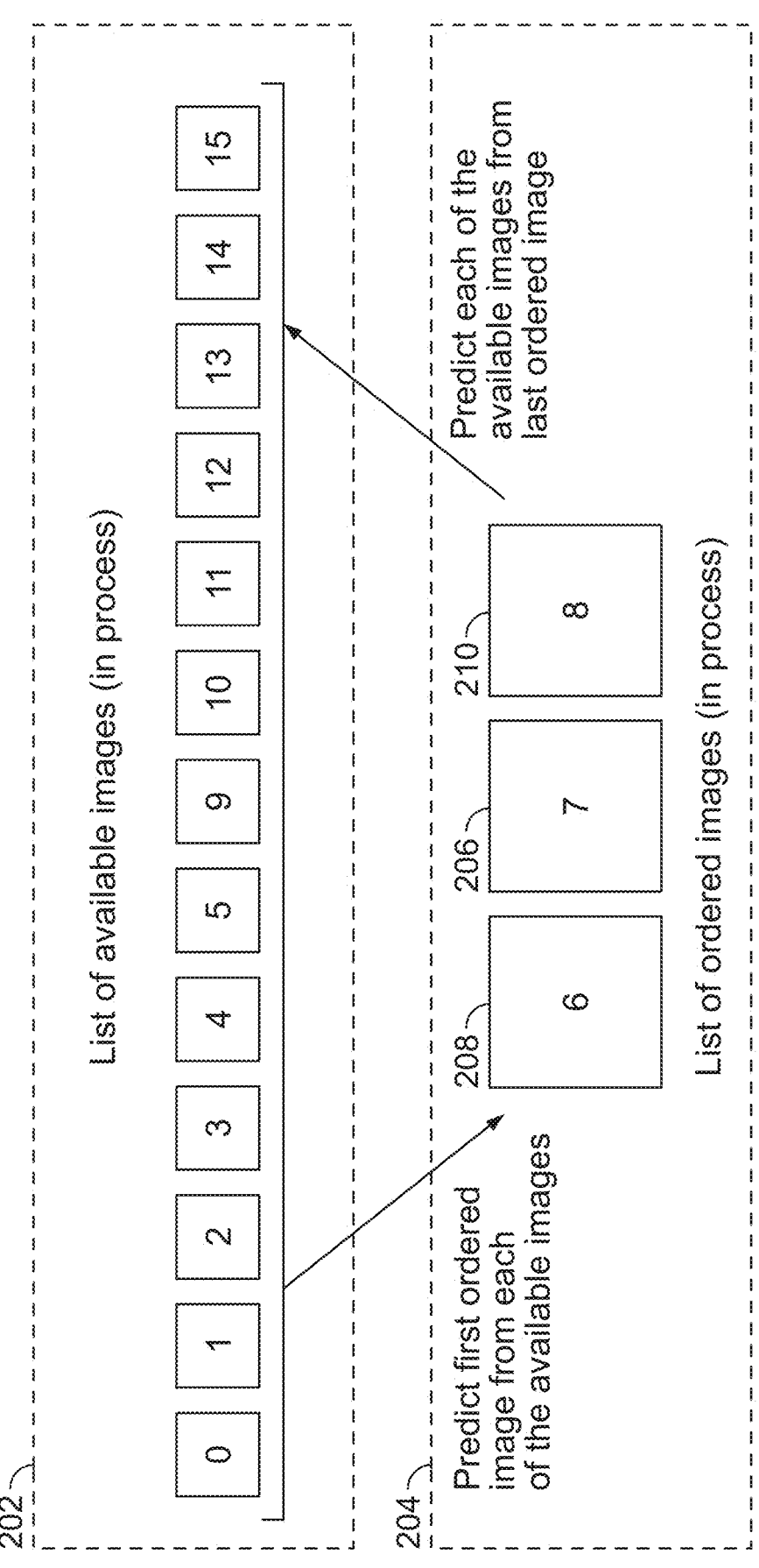
FIG. 2A shows an illustrative technique for processing light field image data, in accordance with some embodiments of this disclosure.

FIG. 2A shows an illustrative technique for processing light field image data, in accordance with some embodiments of this disclosure. In some embodiments, the image data processing system may be configured to generate a group of pictures (GOP) comprising 2D perspective images 102-132, and FIG. 2A shows an illustrative technique for determining an ordering of 2D perspective images 102-132 within the GOP. A GOP may be understood as a set of 2D perspective images at a particular point in time, coded together as a group of perspective images. Such generating of one or more GOPs may be considered to be part of a process of encoding the image data, or may be considered to be part of a pre-processing step to encoding of the image data. A particular media asset may comprise a plurality of GOPs, where each GOP comprises respective perspective images of a respective 2D perspective frame at a different timepoint within the media asset and/or within the duration of the media asset. For example, each GOP may advance one timepoint with respect to the previous GOP. Each GOP may contain any suitable number of perspective images. In some embodiments, the GOP may be contained within a single video stream or multimedia stream, and the GOP may correspond to all views of a scene at one time instance, or multiple GOPs corresponding to respective instances of time may be included in the stream. In some embodiments, each GOP may be encoded as an independent set of data. In some embodiments, any suitable number of GOPs may be transmitted as packets in a bitstream, which may be transmitted over time for display, and may comprise a sequence of 2D perspective images at a particular timepoint from any suitable number of timepoints, which may be displayed in sequence as one or more images or a video.

In some embodiments, the image data processing system accesses LF image data 100 by receiving LF image data 100 over a network (e.g., communication network 506 of FIG. 5 or any other suitable network) from any suitable source (e.g., media content source 502 and/or server 504, or any other suitable data source, or any combination thereof). Additionally or alternatively, the image data processing system may access LF image data 100 by generating the image data, and/or retrieving the image data from memory (e.g., memory or storage 526 or storage 514 or database 505, or any other suitable data store, or any combination thereof) and/or receiving the image data over any suitable data interface, or by accessing the image data using any other suitable methodology, or any combination thereof. In some embodiments, the image data processing system may be configured to access, and/or perform processing on, output or transmit, the image data in response to receiving a user input or a user request, e.g., via user input interface 410 of FIG. 4 and/or I/O circuitry of 3D display device 515.

In some embodiments, the image data processing system may be configured to order 2D perspective images 102-132 in the GOP in a particular order based at least in part on a set of evaluated metrics derived from content of the plurality of 2D perspective images, and/or based at least in part on characteristics associated with equipment used to capture the plurality of 2D perspective images. In some embodiments, the image data processing system may determine the set of evaluated metrics at least in part by determining a prediction efficiency for each 2D perspective image of the plurality of 2D perspective images. For example, the prediction efficiency may correspond to a degree to which each 2D perspective image is usable to predict characteristics of others of the plurality of 2D perspective images. In some embodiments, the particular order of the plurality of 2D perspective images within the GOP enables the image data to be transmitted to the client such that visual quality of the displayed decoded image data (e.g., from the perspective of consumers of a media asset comprising the image data) is maximized for a given data rate of transmitting the image data. For example, given a partial bitrate or bit budget, the order may be optimized to maximize the amount of data to be transmitted while meeting the bit budget. In some embodiments, the particular order of the plurality of 2D perspective images within the GOP enables the image data to be transmitted to the client such that a data rate of transmitting the image data is minimized for a given visual quality of the displayed decoded image data. For example, given a target peak signal-to-noise ratio (PSNR) of a certain dB, the order may be optimized to minimize the amount of data to be transmitted while meeting the PSNR target.

Any suitable technique may be used by the image data processing system to determine the set of evaluated metrics derived from content of the plurality of 2D perspective images, where such set of evaluated metrics may be used to order 2D perspective images 102-132 in the GOP in a particular order. As an example, the image data processing system may be configured to determine a prediction efficiency for each 2D perspective image. For example, as shown in FIG. 2A, the image data processing system may generate data structure 202, which may correspond to a one-dimensional (1D) list (or any other suitable data structure) of available 2D perspective images 102-132 (corresponding to and captured by cameras 0-15, respectively, as shown in FIG. 1A and FIG. 2A). The image data processing system may identify a particular 2D perspective image (e.g., at a spatial center, or any other suitable position, of the array of 2D image array of FIG. 1A or the 1D order of FIG. 2A). The image data processing system may determine which of the other 2D perspective images provide the most efficient predictor of the particular 2D perspective image, and which of the other 2D perspective images can be most efficiently predicted by the particular 2D perspective image (e.g., in the sense of requiring the least data to encode). Based on such determinations, the image data processing system may create data structure 204, which may correspond to a list, or any other suitable data structure, of ordered 2D perspective images 102-132. In some embodiments, the image data processing system may generate data structure 204 such that the initially identified particular 2D perspective image (or representation thereof) may be at a center position (or any other suitable position); the most efficient predictor of the initially identified particular 2D perspective image may be at the start or head of data structure 204 (or at the tail or end or any other suitable position of data structure 204); and/or the most efficiently predicted image may be at the end or tail of data structure 204 (or at the start or head of or any other suitable position of data structure 204). In some embodiments, the image data processing system may repeat such process upon the ends of data structure 202 and 204 until each of the perspective images are accounted for, and the resulting ordering of 2D perspective images may be used to encode video sequences from the camera array.

As shown in the example of FIG. 2A, the image data processing system may, beginning with a set of perspective images of a scene (e.g., as generated by a camera array or a multiview rendering of a synthetic scene model) within a GOP, identify perspective image 206, previously included in data structure 202 corresponding to a list of available perspective images, and cause perspective image 206 (or an indication thereof) to be removed from data structure 202 and added to data structure 204 corresponding to a list of ordered perspective images. Perspective image 206 may be identified on the basis of being at a center of a 2D array of image data 100 shown in FIG. 1A, or at a spatial center of data structure 202. In some embodiments, a particular perspective image may be identified on the basis of any other suitable criteria, e.g., a first image in the array or data structure; a last image in the array or data structure; an upper right corner image of the 2D array of image data 100 or image at any other suitable position in the array or data structure; a particular image having the largest amount of data; a particular image likely to be more prominently displayed to or more commonly viewed by users; or a particular image based on any other suitable characteristic of the perspective images, or any combination thereof.

While data structure 202 is not empty, e.g., includes at least one 2D perspective image (or an indication thereof) within the GOP, the image data processing system may perform an inter-frame prediction (e.g., as between different 2D perspective views associated with the same frame time) of the identified 2D perspective image 206 of data structure 204 (or another 2D perspective image of data structure 204, such as a first image of data structure 204, or any other suitable image of data structure 204) from each 2D perspective image (or a subset of such images) of data structure 202. For example, the image data processing system may perform such inter-frame prediction based at least in part on partitioning each 2D perspective image into a plurality of regions, where each 2D perspective image may comprise any suitable number of regions, and any suitable dimensions (e.g., of pixels or voxels) may be employed for a particular region. In some embodiments, a region may correspond to a tile, a slice, a macroblock, a coding unit, or any other suitable region of any suitable shape and/or size that may be encoded and/or decoded independently, or any combination thereof. A slice may be understood as a structure specified by the H.264 compression standard that is a subset of the image data, and a tile may be understood as a structure specified by the H.265 (HEVC) compression standard. The image data processing system may perform encoding such that each region corresponds to a respective tile as defined by the HEVC standard. In some embodiments, the regions may be rectangular or any other suitable shape. In some embodiments, a size of a tile, and which region of the perspective image it covers, may be arbitrarily specified by an entity controlling the encoding process, e.g., as part of the encoding, dimensions of the regions may be declared. In some embodiments, a slice may correspond to a predefined portion of a perspective image, e.g., an entire top row of a perspective image, or any other suitable portion thereof.

The image data processing system may be configured to compare the regions of perspective image 206, e.g., a reference 2D perspective image, to the regions of each 2D perspective image (or a subset of such images) of data structure 202 to determine similarities or redundancies as between the perspective images. For example, based on such processing, the image data processing system may determine that perspective image 208, included in data structure 202 at the time of the determination, is the most efficient predictor of perspective image 206, e.g., of the images in data structure 202, the image data processing system may determine that the characteristic(s) of perspective image 208 enable perspective image 206 to be encoded using the least amount of data, such as by optimizing the redundancies between images. As a result of this determination, the image data processing system may cause 2D perspective image 208 (or an indication thereof) to be removed from data structure 202 and added to data structure 204. In some embodiments, perspective image 208 may be placed at the head or beginning of a list corresponding to data structure 204, or at any other suitable location of the list, e.g., adjacent to perspective image 206, or at the end of the list, or any other suitable location.

In some embodiments, the image data processing system may be configured to perform an inter-frame prediction of each 2D perspective image (or a subset of such images) of data structure 202 from the identified 2D perspective image 206 of data structure 204 (or another 2D perspective image of data structure 204, such as a last image of data structure 204, or any other suitable image of data structure 204). For example, the image data processing system may compare the partitioned regions of perspective image 206, e.g., a reference 2D perspective image, to the partitioned regions of each 2D perspective image (or a subset of such images) of data structure 202 to determine similarities or redundancies as between the perspective images. Based on such comparison, the image data processing system may determine that perspective image 210, included in data structure 202 at the time of the determination, is most efficiently predicted by perspective image 210, e.g., the image data processing system may determine that perspective image 210, of the images in data structure 202, can be encoded based on 2D perspective image 206 using the least amount of data, such as by optimizing the redundancies between images. As a result of this determination, the image data processing system may cause 2D perspective image 210 (or an indication thereof) to be removed from data structure 202 and added to data structure 204. In some embodiments, perspective image 210 may be placed at the tail or end of a list corresponding to data structure 204, or at any other suitable location of the list, e.g., adjacent to perspective image 206, or at the start of the list, or any other suitable location.

In some embodiments, the image data processing system may determine whether a 2D perspective image (e.g., in the example of FIG. 2A, 2D perspective image 208) identified as being a most efficient predictor of the particular 2D perspective image (e.g., 2D perspective image 206) is the same 2D perspective image (e.g., in the example of FIG. 2A, 2D perspective image 210) identified as being most efficiently predicted by the particular 2D perspective image (e.g., 2D perspective image 206). For example, if the image data processing system determines that 2D perspective image 208 corresponds to both a most efficient predictor of the particular 2D perspective image, as well as a 2D perspective image that is most efficiently predicted by the particular 2D perspective image, the image data processing system may perform any suitable processing. In such instance, the image data processing system may determine to cause 2D perspective image 208 to be placed at either a head or tail of data structure 204 (e.g., depending on which side is most efficient), or may cause 2D perspective image 208 to be placed at any other suitable portion of data structure 204, and may remove 2D perspective image 208 from data structure 202.

Upon determining that the same 2D perspective image is the most efficient predictor of the particular 2D perspective image, as well as the most efficiently predicted 2D perspective image, the image data processing system may perform further processing. For example, the image data processing system may further identify, from among the images remaining in data structure 202, the next most efficient predictor of the particular 2D perspective image (or the 2D perspective image that is the next most efficiently predicted by the particular 2D perspective image) aside from 2D perspective image 208, and may cause the identified 2D perspective image to be placed at a head or tail of data structure 204, or at any other suitable location of data structure 204. For example, the image data processing system may identify a next most efficient predictor of the particular 2D perspective image if 2D perspective image 208 is placed within data structure 204 based on being the most efficiently predicted by the particular 2D perspective image, and may place such next most efficient predictor at the other end of data structure 204 (as compared to 2D perspective image 208), or at any other suitable location of data structure 204. On the other hand, the image data processing system may identify a 2D perspective image that is the next most efficiently predicted by the particular 2D perspective image if 2D perspective image 208 is placed within data structure 204 based on being the most efficient predictor of the particular 2D perspective image, and may place such next most efficiently predicted 2D perspective image at the other end of data structure 204 (as compared to 2D perspective image 208), or at any other suitable location of data structure 204.

In some embodiments, the image data processing system may iteratively repeat the above-described process, or any other suitable variations thereof, until the image data processing system determines that data structure 202 is empty, e.g., when each 2D perspective image has been processed and placed at a particular location in data structure 204. The image data processing system may be configured to store information (e.g., data structure 204) representing the resulting ordering of the 2D perspective images within the GOP, for use in encoding video sequences from the image array using a hybrid video coder. For example, such ordering may be based on determining an ordering of 2D perspective images that in the aggregate requires the least amount of data to produce a given visual quality. In some embodiments, once a particular ordering within a GOP of a particular 3D media asset (e.g., at the beginning of encoding a video sequence) is determined by the image data processing system, such ordering may be employed in connection with future GOPs of the media asset, e.g., the ordering may be applied to the rest of the 3D video.

In some embodiments, the GOP may include any suitable number of key and predictive 2D perspective images, where a key or reference perspective image may be an anchor image or intra-coded perspective image that represents a self-contained or independently decodable image that is independent of other views or pictures in decoding. Within the same 2D perspective frame as (or part of the same scene as) the reference perspective image may be predictive perspective images or bi-directionally predictive coded perspective images, which may contain different information indicating distinctions from the reference perspective image or another predictive perspective image. For example, the image data processing system may predict or detect that adjacent or nearby perspective images within the generated GOP have or may have significant redundancies and similarities across their respective pixel or voxel data, and may employ compression and/or encoding techniques that only encodes a delta or change of the predictive frames with respect to a reference image. Such spatial similarities as between perspective images of the GOP may be exploited to enable perspective images within a GOP to be represented with less bits than their original representations, to thereby conserve storage space needed to store the image data and/or network resources needed to transmit the image data. In some embodiments, compression or encoding techniques may be employed within a single perspective image, to exploit potential redundancies of image data of nearby or adjacent portions of a particular perspective image. The images in a GOP may be encoded using any suitable technique, e.g., differential or predictive encoding, or any other suitable technique or combination thereof. In some embodiments, the image data processing system may generate a vector describing a delta or change from the reference perspective image, and such vector may be usable to determine a predictive perspective image.

In some embodiments, the GOP may be arranged to exploit similarities (e.g., predicted or observed) between nearby or adjacent 2D perspective images. In some embodiments, due to the highly correlated nature of the 2D perspective images, predictive coding may be performed to enable decoding to result in a video sequence where a given 2D perspective image occurs every n frames, where n is the number of 2D perspective images. In some embodiments, the image data processing system may code only a subset of the 2D perspective images and utilize one or more machine learning models to predict intermediate images. For example, the image data processing system may receive image data corresponding to a particular 2D perspective image and use the above-described techniques to generate image data for different 2D perspective images within the same frame and/or in subsequent 2D perspective images of subsequent frames.

In some embodiments, while the image data processing system may employ inter-frame prediction to determine similarity between 2D perspective images of a particular scene at a particular frame time for ordering purposes, GOPs of video from the equipment (e.g., a camera array and/or other suitable equipment or sensors) may be encoded using efficient bidirectional and hierarchical techniques. In some embodiments, the image data processing system may perform the inter-frame prediction efficiency calculation based on a target degree of compression, which may be analogous to the degree of compression anticipated to be used for subsequent video sequences from the equipment used to capture LF image data 100. For example, if LF image data 100 is to be heavily compressed, the 2D perspective images and/or frame(s) for the GOP used to determine ordering may likewise be heavily compressed before the prediction efficiencies are evaluated. In some embodiments, such pre-encoding for assessing the prediction efficiencies may be an intra coding of the reference 2D perspective image, where a target quality level is specified. Such features can help to reduce the complexity of the processes as inter coding may be more computationally intensive.

In some embodiments, the determination of a 2D perspective image of data structure 202 that is the most efficient predictor of a particular 2D perspective image, and/or the determination of a 2D perspective image of data structure 202 that is the most efficiently predicted 2D perspective image based on a particular 2D perspective image, may be implemented by the image data processing system in a bidirectional fashion. For example, 2D perspective images present at both ends of data structure 204 (or present at any suitable portions of data structure 204) may be used to predict, and to be predicted by, each of the 2D perspective images of data structure 202. In some embodiments, selection of a particular 2D perspective image (e.g., from data structure 202) to be appended to the list of ordered images (e.g., data structure 204) may be based on one or more functions of the two amounts of data resulting from the pair of predictions (e.g., the most efficient predictor, and the most efficiently predicted, 2D perspective image with respect to a particular 2D perspective image). For example, such function(s) may correspond to e.g., the sum of both, the minimum of both, the maximum of both, the average of both, or may correspond to any other suitable function(s), or any combination thereof.

Figure 2B:
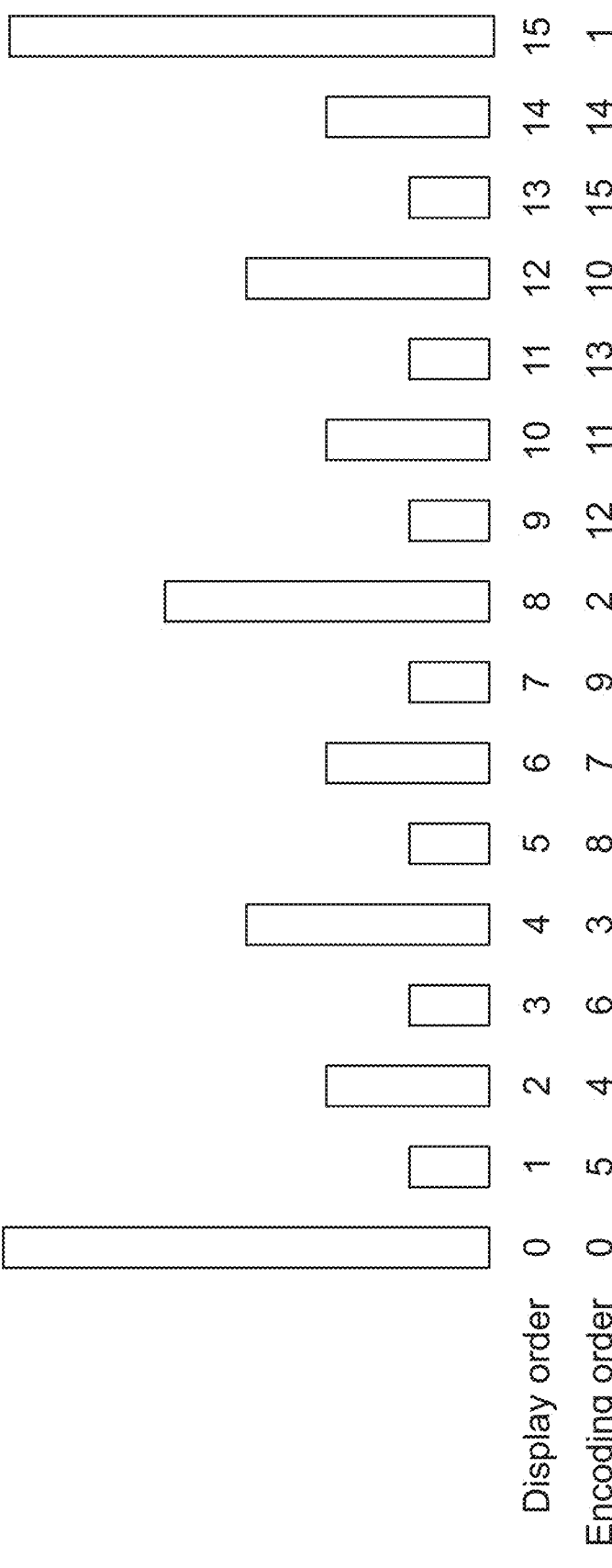
FIG. 2B shows an illustrative hierarchical coding structure for a GOP, in accordance with some embodiments of this disclosure.

FIG. 2B shows an illustrative hierarchical coding structure for a GOP, in accordance with some embodiments of this disclosure. In the example of FIG. 2B, the display order of cameras 0-15 used to capture 2D perspective images 102-132 respectively captured by cameras 0-15 shown in FIG. 1A. As shown, the encoding order in which the 2D perspective images are ordered within the GOP, e.g., as determined based on the technique described in FIG. 2A and/or FIG. 3 and/or using any other suitable technique described herein, differs from the display order 0-15. For example, while camera 0 and camera 1 may be positioned adjacent to each other in the physical camera array, perspective image 102 corresponding to camera 0 is ordered first in the encoding order, whereas perspective image 104 corresponding to camera 1 is ordered fifth in the encoding order. Perspective image 118 (FIG. 1A) corresponding to camera 8 (FIG. 2B) may have been ordered second in the encoding order based on a bidirectional prediction using two reference perspective images, e.g., perspective image 102 corresponding to camera 0 (ordered first in the encoding order) and perspective image 132 corresponding to camera 15 (ordered second in the encoding order). In some embodiments, an encoding data stream transmitted to a decoding device may comprise an indication of the display order (of the cameras used to produce the 2D perspective images) as well as the encoding order (of the 2D perspective images of the GOP), and/or unique identifier(s) for the GOP or orderings associated therewith. Such indications may enable the decoder to decode and reconstruct the 2D perspective images in an optimal order and at the correct portion of the 3D display at the same frame time.

In some embodiments, in the process of determining the 2D perspective ordering, the image data processing system may take into consideration typical coding structures or picture type assignments. In some embodiments, as the sorting process evolves, the GOP may be filled in such that inter-frame prediction efficiencies can be optimized in compression. In other words, inter prediction dependency based on the encoding order may be coupled with the evaluation of prediction efficiencies.

Figure 3:
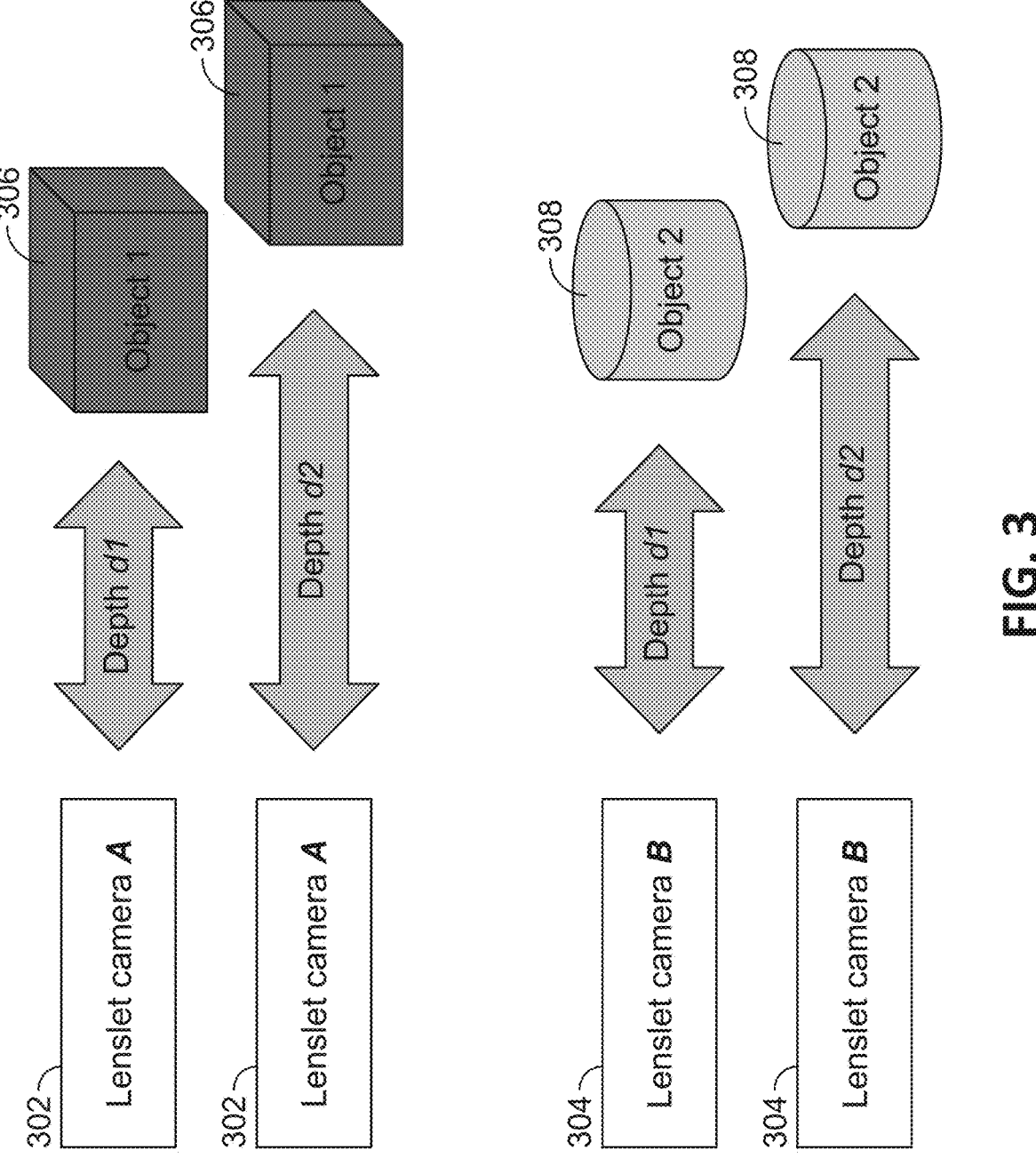
FIG. 3 shows an illustrative technique for processing light field image data, in accordance with some embodiments of this disclosure.

FIG. 3 shows an illustrative technique for processing light field image data, in accordance with some embodiments of this disclosure. In some embodiments, as shown in the example of FIG. 3, the image data processing system may be configured to perform optimization to configure or pre-configure ordering of the 2D perspective images based on characteristics associated with equipment used to capture 2D perspective images 102-132 of FIG. 1A. For example, the characteristics may be a spatial arrangement of the equipment (e.g., which cameras are spatially adjacent or proximate); an angular orientation of the equipment with respect to a captured scene corresponding to LF image data 100; different types of different numbers of equipment or sensors (e.g., a multi-camera array, a camera gantry or a lenslet camera or any other suitable equipment or combination thereof); different capturing systems; different focal lengths;

various depth settings; a type or size or shape or other characteristics of an object being captured; any suitable hardware or software limitation pertinent to the equipment used to capture LF image data 100; or any other suitable characteristics or any combination thereof. In some embodiments, the characteristics of the equipment may correspond to a number, resolution and/or location, position or geometry of the capturing (passive or active) cameras or lasers or within the environment; data from wearable sensors; and/or any other suitable characteristics, or one or more characteristics of an environment in which the imagery was captured (e.g., lighting, shadowing, diffusion or conditions during the capture session, such as at a studio of FIG. 2, a location of the capture, and/or any other suitable characteristics). In some embodiments, the characteristics of the equipment may be indicated in metadata of the LF image data 100, pre-encoded in LF image data 100 using any suitable technique, and/or otherwise appended to or associated with LF image data 100.

For example, the disparity between multiple views from equipment (e.g., a lenslet camera 302 or 304, or multicamera array) usually includes differences more than those from simple translational motion or camera panning, e.g., angular and depth-dependent disparity may often introduce occlusions and deformation from object to object. Therefore, the optimization of light-field representation for compression may show dependency on both the setup of the capturing device as well as the depth range from which objects and/or scenes get captured. In some embodiments, taking such features into account, the image data processing system may be configured to pre-configure the encoding setup with an optimization applied to a known arrangement of micro-sensors or multi-cameras. Such optimization may also provide granularity in the pre-configuration such that a different ordering of the 2D perspective images may be selected for an object captured from a different depth, or different distance from the camera, or from among scenes spanning different ranges of depths.

In the example of FIG. 3, the image data processing system may determine pre-configurations for each of camera 302 and camera 304, which may depend at least in part on different depth settings from the target objects 306 and 308, respectively, and/or any other suitable factors. For example, the image data processing system may determine that a particular ordering of 2D perspective images within a GOP is optimal for a lenslet camera 302 at a depth d1 from object 306, whereas a different ordering of 2D perspective images within a GOP is optimal for a lenslet camera 302 at depth d2 from object 306, and/or that yet another ordering of 2D perspective images within a GOP is optimal for a lenslet camera 302 capturing multiple objects at differing depths d1 and d2. As another example, the image data processing system may determine that a particular ordering of 2D perspective images within a GOP is optimal for a lenslet camera 304 at a depth d1 from object 308, whereas a different ordering of 2D perspective images within a GOP is optimal for a lenslet camera 304 at depth d2 from object 308, and/or that yet another ordering of 2D perspective images within a GOP is optimal for a lenslet camera 304 capturing multiple objects at differing depths d1 and d2.

In some embodiments, for each depth setting, different test objects may be captured and used in the optimization, which may exhibit statistical invariance of pre-configurations to the less predictable objects in real capturing. In such an example, the range of scene depths for a given video sequence may be extracted from the 2D perspective images using any suitable methodology, e.g., performing image processing, examining the range of disparities between two or more 2D perspective images for the first frame in a video stream, and/or any other suitable techniques. For example, optimal orderings for certain ranges of scene depths may be precomputed and stored. In some embodiments, an appropriate ordering to optimize coding efficiency may be automatically selected from the set of pre-computed stored orderings for respective camera setups or configurations, e.g., based on determining the range of disparities of the scene and comparing the determined range of disparities to the stored sets of parameters. In some embodiments, the techniques described in FIG. 3 may be used as an alternative to, or in conjunction with, the techniques described in FIG. 2A, to dynamically determine an optimal ordering of 2D perspective images within a GOP for maximizing the coding efficiency or maximizing visual quality at a given bandwidth. In some embodiments, the techniques described in FIGS. 2-3 may be optimal for a portable or dynamic scene capture scenario, and/or optimal for a more controlled capture environment, such as in an indoor studio.

Based at least in part on the ordering of the 2D perspective images within the GOP, determined based on the techniques described herein, the image data processing system may generate encoding data comprising one or more compressed 2D perspective images (e.g., comprising indications of voxel or pixel values and voxel or pixel coordinates), as well as residual or error data and any other suitable data (e.g., indications of the display order and/or encoding order of FIG. 3 or other suitable information to help facilitate decoding). For example, the image data processing system may encode certain 2D perspective images in their entirety (e.g., one or more reference 2D perspective images) and generate residual or error data (e.g., a motion vector) indicative of the differences between the one or more reference 2D perspective image and other images. Such residual data for a particular 2D perspective image may require fewer bits to transmit as compared to encoding the entirety of the particular 2D perspective, and the techniques described herein may optimize predictive efficiency based on the ordering within the GOP, thereby minimizing the amount of data to be transmitted to the decoding device and enabling efficient packaging of the encoding data. For example, all of the pixel or voxel values for a predicted 2D perspective image need not be transmitted or stored, thereby conserving storage and/or network resources for transmitting the image data.

In some embodiments, the decoding device (e.g., client device 515 of FIG. 5 and/or any other suitable decoding device executing the image data processing application) may be configured to generate for presentation the scene corresponding to LF image data 100 based on the encoding data comprising the one or more reference 2D perspective images, e.g., including decoding the image data by applying the motion vector associated with the residual data to reconstruct the other 2D perspective images of the scene. In some embodiments, an encoder (e.g., at server 504 of FIG. 5) may be configured to receive indications of predictions made by the decoding device (e.g., on the basis of the motion vector) and transmit corrections to the predictions based on the ground truth LF image data 100. In some embodiments, the residual may be zero or close to zero, e.g., after a quantization operation is performed. In some embodiments, the image data processing system may be configured to output the encoding data to another suitable computing resource (e.g., a Versatile Video Coding (VVC) encoder, or any other suitable encoding tool, or any combination thereof) to perform encoding.

Figure 4:
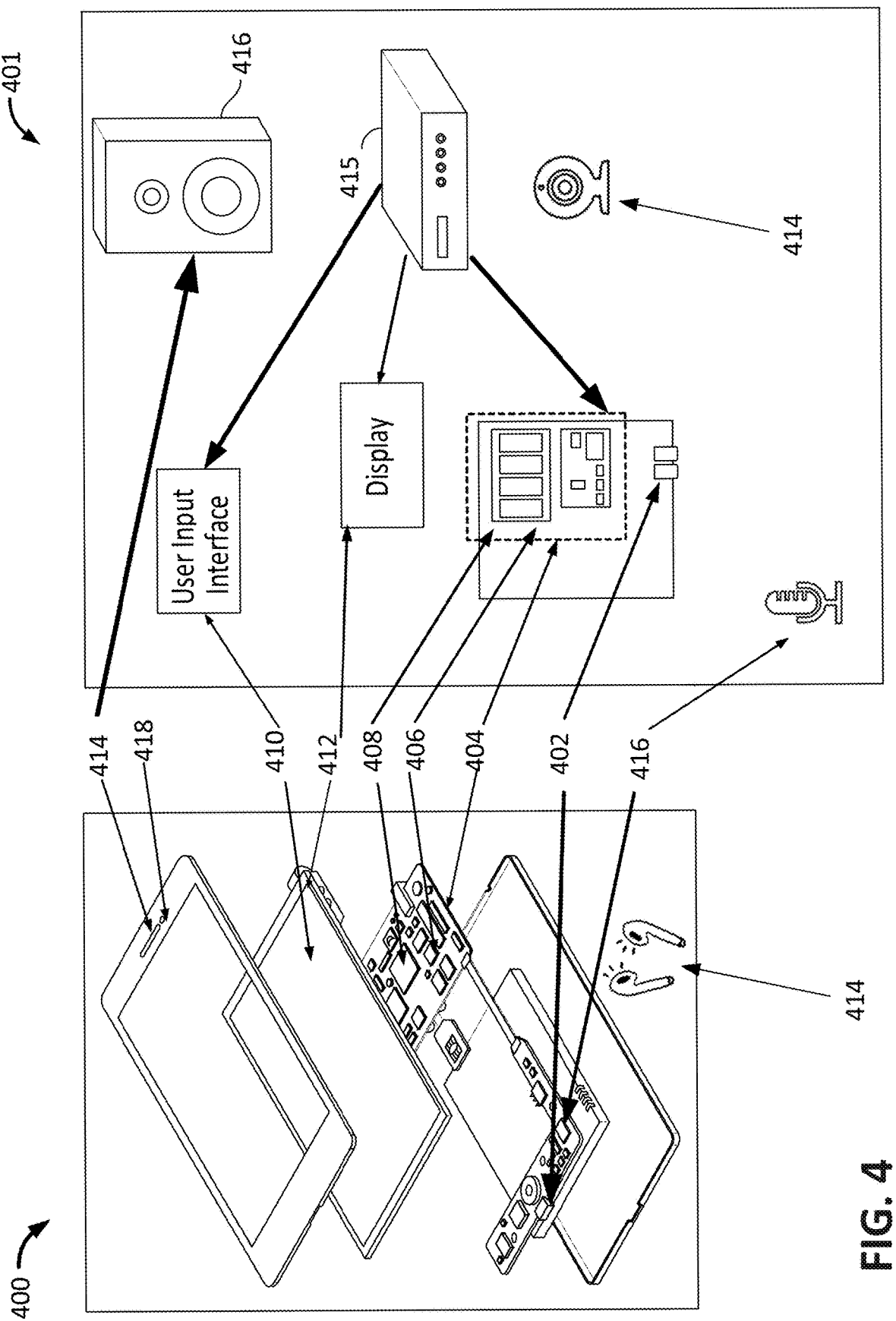
FIGS. 4-5 show illustrative devices and systems for processing light field image data for presentation on a 3D display, in accordance with some embodiments of this disclosure.
Figure 5:
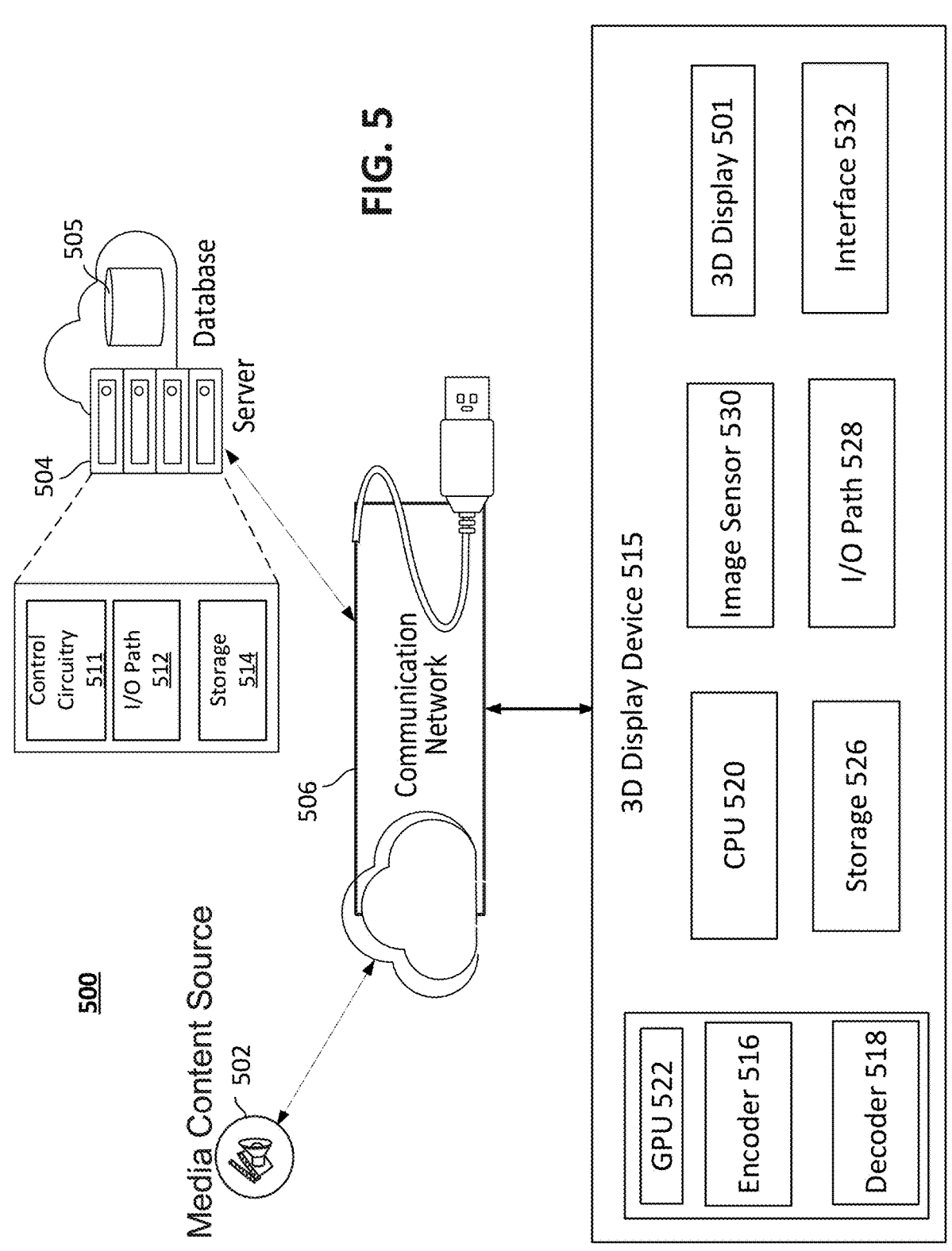

FIGS. 4-5 describe illustrative devices, systems, servers, and related hardware for show illustrative devices and systems for processing light field image data for presentation on a 3D display, in accordance with some embodiments of this disclosure. FIG. 4 shows generalized embodiments of illustrative user devices 400 and 401, which may correspond to and/or include or otherwise be in communication with or associated with, a 3D display. For example, user equipment device 400 may be a smartphone device, a tablet, smart glasses, a virtual reality or augmented reality device, or any other suitable device capable of presenting and/or processing 3D media assets and capable of transmitting and receiving data (e.g., LF image data) over a communication network. In another example, user equipment device 401 may be a user television equipment system or device. User television equipment device 401 may include set-top box 415. Set-top box 415 may be communicatively connected to microphone 416, audio output equipment (e.g., speaker or headphones 414), and display 412. In some embodiments, microphone 416 may receive audio corresponding to a voice of a user, e.g., a voice command. In some embodiments, display 412 may be a television display or a computer display. In some embodiments, display 412 may correspond to a 3D display, e.g., a LF display, a tensor display, a volumetric display, a holographic display, a multi-layer display, modular display, LCD display or any other suitable type of display, or any combination thereof.

In some embodiments, set-top box 415 may be communicatively connected to user input interface 410. In some embodiments, user input interface 410 may be a remote control device. Set-top box 415 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 4. In some embodiments, device 400 may comprise any suitable number of sensors, as well as a GPS module (e.g., in communication with one or more servers and/or cell towers and/or satellites) to ascertain a location of device 400.

Each one of user equipment device 400 and user equipment device 401 may receive content and data via input/output (I/O) path 402. I/O path 402 may provide content (e.g., broadcast programming, on-demand programming, Internet content, content available over a local area network (LAN) or wide area network (WAN), and/or other content) and data to control circuitry 404, which may comprise processing circuitry 406 and storage 408. Control circuitry 404 may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing. While set-top box 415 is shown in FIG. 4 for illustration, any suitable computing device having processing circuitry, control circuitry, and storage may be used in accordance with the present disclosure. For example, set-top box 415 may be replaced by, or complemented by, a personal computer (e.g., a notebook, a laptop, a desktop), a smartphone (e.g., device 400), a tablet, a network-based server hosting a user-accessible client device, a non-user-owned device, any other suitable device, or any combination thereof.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for the image data processing system stored in memory (e.g., storage 408). Specifically, control circuitry 404 may be instructed by the image data processing system to perform the functions discussed above and below. In some implementations, processing or actions performed by control circuitry 404 may be based on instructions received from the image data processing system.

In client/server-based embodiments, control circuitry 404 may include communications circuitry suitable for communicating with a server or other networks or servers. The image data processing system may be a stand-alone application implemented on a device or a server. The image data processing system may be implemented as software or a set of executable instructions. The instructions for performing any of the embodiments discussed herein of the image data processing system may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of device 400.

In some embodiments, the image data processing system may be or comprise a client/server application where only the client application resides on device 400, and a server application resides on an external server (e.g., one or more servers 504). For example, the image data processing system may be implemented partially as a client application on control circuitry 404 of device 400 and partially on server 504 as a server application running on control circuitry 511. Server 504 may be a part of a local area network with one or more of devices 400 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 504), referred to as "the cloud." Device 400 may be a cloud client that relies on the cloud computing capabilities from server 504 to perform at least a portion of the functionality described herein. When executed by control circuitry 404 or 511, the image data processing system may instruct control circuitry 404 or 511 circuitry to perform processing tasks for the client device and facilitate a media consumption session integrated with social network services. The client application may instruct control circuitry 404 to determine whether processing should be offloaded.

Control circuitry 404 may include communications circuitry suitable for communicating with a server, social network service, a table or database server, or other networks or servers The instructions for carrying out the above mentioned functionality may be stored on a server (which is described in more detail in connection with FIG. 4). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as image data described above. Nonvolatile memory may also be used (e.g., to launch a boot-up routine and other instructions). Cloud-based storage may be used to supplement storage 408 or instead of storage 408.

Control circuitry 404 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to H.265 signals for storage) may also be provided. Control circuitry 404 may also include scaler circuitry for upconverting and downconverting content into the preferred output format of user equipment 400. Control circuitry 404 may also include digital-to-analog converter circuitry and analog-to-digital converter circuitry for converting between digital and analog signals. The tuning and encoding circuitry may be used by user equipment device 400, 401 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment device 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 415.

Audio output equipment 414 may be integrated with or combined with display 412. In some embodiments, display 412 may comprise one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of device 400 or 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a CCD, or a CMOS image sensor, or any other suitable image sensor, or any combination thereof. Camera 418 may be an analog camera that converts to digital images via a video card. In some embodiments, camera 418 may be configured to capture 3D image data, e.g., LF image data, and may comprise a camera array, a lenslet camera and/or any other suitable equipment.

The image data processing system may be implemented using any suitable architecture. For example, it may be a stand-alone application wholly-implemented on each one of user equipment device 400 and user equipment device 401. In such an approach, instructions of the image data processing system may be stored locally (e.g., in storage 408), and data for use by the application is downloaded on a periodic basis (e.g., from an out-of-band feed, from an Internet resource, or using another suitable approach). Control circuitry 404 may retrieve instructions of the image data processing system from storage 408 and process the instructions to provide media consumption and social network interaction functionality and generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 404 may allow a user to provide user profile information or may automatically compile user profile information. For example, control circuitry 404 may access and monitor network data, video data, audio data, processing data, participation data from a social network profile. Control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

In some embodiments, the image data processing system is a client/server-based application. Data for use by a thick or thin client implemented on each one of user equipment device 400 and user equipment device 401 may be retrieved on-demand by issuing requests to a server remote to each one of user equipment device 400 and user equipment device 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on device 400. This way, the processing of the instructions is performed remotely by the server while the resulting displays (e.g., that may include text, a keyboard, or other visuals) are provided locally on device 400. Device 400 may receive inputs from the user via input interface 410 and transmit those inputs to the remote server for processing and generating the corresponding displays. For example, device 400 may transmit a communication to the remote server indicating that an up/down button was selected via input interface 410. The remote server may process instructions in accordance with that input and generate a display of the application corresponding to the input (e.g., a display that moves a cursor up/down). The generated display may then be transmitted to device 400 for presentation to the user.

In some embodiments, the image data processing system may be downloaded and interpreted or otherwise run by an interpreter or virtual machine (run by control circuitry 404). In some embodiments, the image data processing system may be encoded in the ETV Binary Interchange Format (EBIF), received by control circuitry 404 as part of a suitable feed, and interpreted by a user agent running on control circuitry 404. For example, the image data processing system may be an EBIF application. In some embodiments, the image data processing system may be defined by a series of JAVA-based files that are received and run by a local virtual machine or other suitable middleware executed by control circuitry 404. In some of such embodiments (e.g., those employing H.265 or other digital media encoding schemes), the image data processing system may be, for example, encoded and transmitted in an H.265 object carousel with the H.265 audio and video packets of a program.

FIG. 5 is a diagram of an illustrative system 500, in accordance with some embodiments of this disclosure. 3D display device 515 (e.g., comprising or otherwise coupled to 3D display 501, or any other suitable device, or any combination thereof) may be coupled to communication network 506, and may correspond to device 400 or device 401. Communication network 506 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 506.

System 500 may comprise media content source 502, one or more servers 504, and one or more 3D display devices 515 and/or any other suitable components (e.g., edge servers, such as part of a content delivery network). In some embodiments, the image data processing system may be executed at one or more of control circuitry 511 of server 504 (and/or control circuitry of 3D display device 515 and/or at media content source 502). In some embodiments, any suitable data structure related to LF image data 100 of FIG. 1A-1B, and/or data structure 202 and 204 of FIG. 2A-2B, and/or data related to 3D image capture equipment and corresponding optimal ordering of 2D perspective images, may be stored at database 505 maintained at or otherwise associated with server 504, and/or at storage at 3D display device 515.

In some embodiments, server 504 may include control circuitry 511 and storage 514 (e.g., RAM, ROM, hard disk, Removable Disk, etc.). Storage 514 may store one or more databases. Server 504 may also include an input/output path 512. I/O path 512 may provide media consumption data, social networking data, device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 (and specifically processing circuitry) to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 511 may be distributed across multiple separate processors or pro-cessing units, for example, multiple of the same type of processing units (e.g., two Intel Core i7 processors) or multiple different processors (e.g., an Intel Core i5 processor and an Intel Core i7 processor). In some embodiments, control circuitry 511 executes instructions for the image data processing system stored in memory (e.g., the storage 514). Memory may be an electronic storage device provided as storage 514 that is part of control circuitry 511.

3D display device 515 may comprise one or more of each of GPU 522, encoder 516, decoder 518, CPU 520, storage 526, 3D display 501, video interface 532, I/O path 528, and image sensor 530. GPU 522 may correspond to a computing processor specially designed to quickly process video sig-nals, and may be implemented as part of a graphics card. In some embodiments, GPU 522 may comprise encoder 516 and/or decoder 518, or encoder 516 and/or decoder 518 may be otherwise separately implemented within or external to 3D display device 515. In some embodiments, server 504 and/or media content source 502 may comprise or be part of a content delivery network (e.g., comprising one or more data centers, and/or edge device), with any suitable number of GPUs, e.g., configured to perform at least a portion of encoding and/or decoding of the image data. For example, server 504 and/or media content source 502 may ingest uncompressed LF image data (or encoded in a particular format) and perform at least a portion of the encoding process described herein (or transcode the particular format to a more suitable format). 3D display device 515 may receive encoded data locally or over a communication network. In some embodiments, display device 515 may comprise any suitable hardware and/or software configured to perform multiplexing and/or demultiplexing of image data.

Decoder 518 may comprise any suitable combination of hardware and/or software configured to convert data in a coded form to a form that is usable as video signals and/or audio signals or any other suitable type of data signal, or any combination thereof. Encoder 516 may comprise any suit-able combination of hardware and/or software configured to process data to reduce storage space required to store the data and/or bandwidth required to transmit the image data, while minimizing the impact of the encoding on the quality of the video or one or more images. Encoder 516 and/or decoder 518 may utilize any suitable algorithms and/or compression standards and/or codecs. In some embodi-ments, encoder 516 and/or decoder 518 may be a virtual machine that may reside on one or more physical servers that may or may not have specialized hardware, and/or a cloud service may determine how many of these virtual machines to use based on established thresholds. In some embodi-ments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 516 and/or decoder 518 may be part of, or external to, CPU 520. In some embodiments, encoder 516 and/or decoder 518 may comprise any suitable number of encoders, at a single location or distributed at any suitable number of locations. In some embodiments, decoder 518 may receive a plurality of 2D perspective images corresponding to a single instance of time in a media asset. In some embodiments, the encoding data may comprise identifying information (e.g., in a header) specifying a destination module assigned by the image data processing system.

CPU 520 may be implemented in a similar manner as control circuitry 404, and storage 526 may be implemented in a similar manner as storage 408. In some embodiments, interface 532 may be any suitable interface configured to transmit video and/or audio data to 3D display 501 (e.g., HDMI, DisplayPort or any other suitable interface or any combination thereof), and may utilize any suitable multi-plexing or demultiplexing technique to combine or separate signals. In some embodiments, decoder 518 may be external to, or comprise part of, 3D display 501 comprising a plurality of modules. For example, each display module may comprise a respective decoder. I/O path 528 may be imple-mented in a similar manner as I/O path 402, and image sensor 530 may be implemented in a similar manner as camera 418. In some embodiments, image sensor 530 may comprise or be implemented as part of a 2D camera array or image sensor and internal microlens arrangement, config-ured to capture LF information of a scene. In some embodi-ments, 3D display device 515 may comprise or otherwise be coupled to synthetic content such as rendered by a 3D model or game engine, to enable 3D display 501 to render light field content with a virtual camera in an array of positions to create the same sort of representation, e.g., to provide a video game experience and/or virtual reality and/or aug-mented reality experience for a user. In some embodiments, any suitable technique and/or components may be used to display parallax views via 3D display 501, e.g., a backlight with multiple display layers, any suitable driver electronics or other displays, etc. The 2D perspective images may be, e.g., real world scenes captured by a camera, or computer generated views or any combination thereof.

FIG. 6 is a flowchart of a detailed illustrative process for processing image data to be transmitted to a 3D display, in accordance with some embodiments of this disclosure. In various embodiments, the individual steps of process 600 may be implemented by one or more components of the devices and systems of FIGS. 1-5. Although the present disclosure may describe certain steps of process 600 (and of other processes described herein) as being implemented by certain components of the devices and systems of FIGS. 1-5, this is for purposes of illustration only, and it should be understood that other components of the devices and sys-tems of FIGS. 1-5 may implement those steps instead. In addition, one or more steps of process 600 may be incor-porated into or combined with one or more steps of any other process or embodiment (e.g., FIG. 7, FIG. 8, or any other embodiment disclosed herein, or any combination thereof).

At 602, the image data processing system may access image data (e.g., LF image data 100 of FIGS. 1A-1B) comprising a plurality of 2D perspective images (e.g., 2D perspective images 102-132 of FIG. 1A) that exhibit paral-lax for presentation on a 3D display (e.g., 3D display 501 of 3D display device 515 of FIG. 5, which may be, for example, a light field display). For example, the image data processing system may generate such image data or otherwise receive the image data over a wired connection or wireless network or otherwise retrieve the image data from storage 526. In some embodiments, each of the plurality of 2D perspective images may correspond to different perspectives of a particular scene at a same timepoint of a media asset.

In some embodiments, the accessed image data may be represented in the form of a data structure (e.g., generated at one or more of media content source 502, server 504 or 3D display device 515 of FIG. 5, or any other suitable device, or any combination thereof) indicating any suitable amount or types of information. For example, such a data structure may store information regarding the 2D perspective images; a size and location of particular 2D perspective images or portions thereof; information regarding the characteristics of equipment used to capture the image data; information regarding a particular frame; a unique identifier for each GOP; information indicating a particular angle or orientation from which a particular 2D perspective image was recorded; information regarding the media asset (e.g., a duration of the media asset); a time stamp of the 2D perspective images; the date and/or time of the media asset; locations of objects within the 2D perspective images; and/or any other suitable information, or any combination thereof. In some embodiments, such data structure may specify a playlist or manifest file, e.g., providing URLs to different variants of 2D perspective images, which may be suitable based on current network conditions.

At 604, the image data processing system may encode the image data (e.g., LF image data 100 of FIGS. 1A-1B) by generating a GOP that comprises the plurality of 2D perspective images (e.g., 2D perspective images 102-132 of FIG. 1A). The image data processing system may further perform the encoding of the image data by ordering the plurality of 2D perspective images within the GOP in a particular order. Such particular order may be based on a set of evaluated metrics derived from content of the plurality of 2D perspective images (e.g., as discussed in connection with FIGS. 2A-2B and 7) and/or based on characteristics associated with equipment used to capture the plurality of 2D perspective images (e.g., as discussed in connection with FIGS. 3 and 8). In some embodiments, the image data processing system generates the GOP based at least in part on spatial predictions and/or temporal predictions associated with the plurality of 2D perspective images, to code the 2D perspective images based on exploiting similarities as between 2D perspective images that are adjacent or otherwise nearby or proximate to each other.

In some embodiments, such encoding may be performed using encoder 516 of FIG. 5, and/or any other suitable encoder, such as at a server (e.g., server 504 of FIG. 5, media content source 502 or any other suitable device or any combination thereof) remote from 3D display device 515. For example, the image data processing system may, in performing the encoding of the image data, employ a hybrid video coder such as, for example, utilizing the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

In some embodiments, the image data processing system may determine the set of evaluated metrics at least in part by determining a prediction efficiency for each 2D perspective image of the plurality of 2D perspective images. For example, the prediction efficiency may correspond to a degree to which each 2D perspective image is usable to predict characteristics of others of the plurality of 2D perspective images. In some embodiments, the particular order of the plurality of 2D perspective images within the GOP enables the image data to be transmitted to the client such that visual quality of the displayed decoded image data (e.g., from the perspective of consumers of a media asset comprising the image data) is maximized for a given data rate of transmitting the image data. For example, given a partial bitrate or bit budget, the order may be optimized to maximize the amount of data to be transmitted while meeting the bit budget. In some embodiments, the particular order of the plurality of 2D perspective images within the GOP enables the image data to be transmitted to the client such that a data rate of transmitting the image data is minimized for a given visual quality of the displayed decoded image data. For example, given a target peak signal-to-noise ratio (PSNR) of a certain dB, the order may be optimized to minimize the amount of data to be transmitted while meeting the PSNR target.

In some embodiments, in addition or alternative to determining the set of evaluated metrics, the image data processing system may determine characteristics associated with equipment used to capture the plurality of 2D perspective images, and compare such characteristic to historical data (e.g., stored at database 505 of FIG. 5) indicating an optimal GOP ordering for particular equipment characteristics. In some embodiments, the image data processing system may determine such equipment characteristics as part of the ordering determination only if a confidence level for prediction efficiencies associated with the 2D perspective images is below a predetermined threshold, or may determine such equipment characteristics regardless.

In some embodiments, the image data processing system may determine a degree to which the determined equipment characteristics match the historical data. For example, in determining an ordering for the GOP, the image data processing system may determine how much each factor (e.g., the prediction efficiencies and the equipment characteristics) should influence the ordering, such as by weighting the factors based on whether the prediction efficiencies exceed a threshold, and/or the degree to which the determined equipment characteristics match the historical data. For example, if there is a strong match between the equipment characteristics and the historical data indicating an optimal ordering for such characteristics, the image data processing system may more heavily weight the ordering suggested by the historical data as compared to a weaker match. In some embodiments, the image data processing system may determine such equipment characteristics as part of the ordering determination when an environment corresponding to a scene being captured has certain characteristics (e.g., an indoor studio or an outdoor environment).

At 606, the image data processing system may transmit the encoded image data for display (e.g., to a decoding device, such as, for example, 3D display device 515 of FIG. 5). In some embodiments, based at least in part on the encoding performed at 604 with respect to optimally ordering the 2D perspective images in the GOP, the encoding data may comprise one or more compressed 2D perspective images and residual or error data and any other suitable data. In some embodiments, the decoding device may be configured to generate for presentation the scene corresponding to LF image data 100 based on the encoding data comprising the one or more reference 2D perspective images, e.g., including decoding the image data by a motion vector associated with the residual data to reconstruct the other 2D perspective images of the scene. In some embodiments, an encoder (e.g., at server 504 of FIG. 5) may be configured to receive indications of predictions made by the decoding device (e.g., on the basis of the motion vector) and transmit corrections to the predictions based on the ground truth LF image data 100. In some embodiments, the encoding data transmitted to a decoding device may comprise an indication of the display order (of the cameras used to produce the 2D perspective images) as well as the encoding order (of the 2D perspective images of the GOP), and/or unique identifier(s) for the GOP or orderings associated therewith. Such indications may enable the decoder to decode and reconstruct the 2D perspective images in an optimal order and at the correct portion of the 3D display at the same frame time. For example, such 2D perspective images may be part of a media asset requested for consumption by a user at a 3D display, e.g., a light field display.

FIG. 7 is a flowchart of a detailed illustrative process for determining an ordering of 2D perspective images in a GOP, in accordance with some embodiments of this disclosure. In various embodiments, the individual steps of process 700 may be implemented by one or more components of the devices and systems of FIGS. 1-5. Although the present disclosure may describe certain steps of process 700 (and of other processes described herein) as being implemented by certain components of the devices and systems of FIGS. 1-5, this is for purposes of illustration only, and it should be understood that other components of the devices and systems of FIGS. 1-5 may implement those steps instead. In addition, one or more steps of process 700 may be incorporated into or combined with one or more steps of any other process or embodiment (e.g., FIG. 6 or FIG. 8, or any other embodiment disclosed herein, or any combination thereof).

In some embodiments, any suitable portion of the steps described in FIG. 7 may be used to determine the set of evaluated metrics derived from content of the plurality of 2D perspective images, as described in 604 of FIG. 6.

At 702, the image data processing system may generate a first data structure (e.g., data structure 202 of FIG. 2A, which may correspond to a 1D list, or any other suitable data structure, of available 2D perspective images 102-132 corresponding to and captured by cameras 0-15, respectively, as shown in FIG. 1A and FIG. 2A).

At 704, the image data processing system may determine whether the first data structure (e.g., data structure 202 of FIG. 2A) contains at least one 2D perspective image, e.g., whether a list of available 2D perspective images corresponding to data structure 202 is empty. Upon determining that data structure 202 contains at least one reference to a 2D perspective image (e.g., one or more of 2D perspective images 102-132 of FIG. 1A), processing may proceed to 706; otherwise processing may proceed to 720.

At 706, the image data processing system may identify a particular 2D perspective image (e.g., at a spatial center, or any other suitable position, of 2D image array of FIG. 1A or the 1D order of FIG. 2A) of the plurality of 2D perspective images of the first data structure (e.g., data structure 202 of FIG. 2A). In some embodiments, the particular perspective image may be identified on the basis of any other suitable criteria, e.g., a first image in the array or data structure, a last image in the array or data structure, an upper right corner image of the 2D array of image data 100 or an image at any other suitable position in the array or data structure, a particular image having the largest amount of data, a particular image likely to be more prominently displayed to or more commonly viewed by users, or based on any other suitable characteristic of the perspective images, or any combination thereof. In some embodiments, the image data processing system may modify the first data structure by causing the identified particular 2D perspective image (e.g., 2D perspective image 206 of FIG. 2A) or an indication thereof to be removed from the first data structure and placed in a second data structure (e.g., data structure 204 of FIG. 2A, which may comprise a list of 2D perspective images ordered in an optimal manner).

At 708 and 710, the image data processing system may respectively determine which of the other 2D perspective images of the first data structure (e.g., data structure 202 of FIG. 2A) provide the most efficient predictor of the particular 2D perspective image, and which of the other 2D perspective images can be most efficiently predicted by the particular 2D perspective image (e.g., in the sense of requiring the least data to encode). Based on such determinations, the image data processing system may create data structure 204, which may correspond to a list, or any other suitable data structure, of ordered 2D perspective images 102-132.

While data structure 202 is not empty, e.g., it includes at least one 2D perspective image (or an indication thereof) within the GOP, the image data processing system may perform an inter-frame prediction (e.g., as between different 2D perspective views associated with the same frame time) of the identified 2D perspective image 206 of data structure 204 (or another 2D perspective image of data structure 204, such as a first image of data structure 204, or any other suitable image of data structure 204) from each 2D perspective image (or a subset of such images) of data structure 202. For example, the image data processing system may perform such inter-frame prediction based at least in part on partitioning each 2D perspective image into a plurality of regions, where each 2D perspective image may comprise any suitable number of regions, and any suitable dimensions (e.g., of pixels or voxels) may be employed for a particular region. The image data processing system may be configured to compare the regions of perspective image 206, e.g., a reference 2D perspective image, to the regions of each 2D perspective image (or a subset of such images) of data structure 202 to determine similarities or redundancies as between the perspective images. For example, based on such processing, the image data processing system may determine that perspective image 208, included in data structure 202 at the time of the determination, is the most efficient predictor of perspective image 206, e.g., of the images in data structure 202, the image data processing system may determine that the characteristics of perspective image 208 enable perspective image 206 to be encoded using the least amount of data, such as by optimizing the redundancies between images.

In some embodiments, the image data processing system may be configured to perform an inter-frame prediction of each 2D perspective image (or a subset of such images) of data structure 202 from the identified 2D perspective image 206 of data structure 204 (or another 2D perspective image of data structure 204, such as a last image of data structure 204, or any other suitable image of data structure 204). For example, the image data processing system may compare the partitioned regions of perspective image 206, e.g., a reference 2D perspective image, to the partitioned regions of each 2D perspective image (or a subset of such images) of data structure 202 to determine similarities or redundancies as between the perspective images. Based on such comparison, the image data processing system may determine that perspective image 210, included in data structure 202 at the time of the determination, is most efficiently predicted by perspective image 206, e.g., the image data processing system may determine that perspective image 210, of the images in data structure 202, can be encoded based on 2D perspective image 206 using the least amount of data, such as by optimizing the redundancies between images. In some embodiments, the image data processing system may employ one or more machine learning models to determine which of the 2D perspective images most efficiently predicts the particular 2D perspective image, and/or which of the 2D perspective images is most efficiently predicted by the particular 2D perspective image.

At 712, the image data processing system may determine whether the determined 2D perspective images match. For example, the image data processing system may determine whether 2D perspective image 208 corresponding to a most efficient predictor of 2D perspective image 206, and 2D perspective image 210, corresponding to a most efficiently predicted image from 2D perspective image 206, are the same 2D perspective image. Upon determining that such 2D perspective images match, processing may proceed to 716; otherwise processing may proceed to 714.

At 714, based on determining at 712 that the determined 2D perspective images (e.g., 2D perspective image 208 and 2D perspective image 210 of FIG. 2A) are distinct from each other, the image data processing system may cause such determined 2D perspective images to be placed at respective portions of a second data structure (e.g., data structure 204 of FIG. 2A). For example, the image data processing system may cause 2D perspective image 210 (or an indication thereof) to be removed from data structure 202 and added to data structure 204. In some embodiments, perspective image 210 may be placed at the tail or end of a list corresponding to data structure 204, or at any other suitable location of the list, e.g., adjacent to perspective image 206, or at the start of the list, or any other suitable location. The image data processing system may cause 2D perspective image 208 (or an indication thereof) to be removed from data structure 202 and added to data structure 204. In some embodiments, perspective image 208 may be placed at the head or beginning of a list corresponding to data structure 204, or at any other suitable location of the list, e.g., adjacent to perspective image 206, or at the end of the list, or any other suitable location.

At 716, the image data processing system may, based on determining at 712 that the determined 2D perspective images are the same 2D perspective image, cause such 2D perspective image to be placed at respective portions of a second data structure (e.g., data structure 204 of FIG. 2A). For example, 2D perspective image 208 of FIG. 2A may be determined to be both a most efficient predictor of 2D perspective image 206 and a most efficiently predicted image from 2D perspective image 206. In such instance, the image data processing system may determine to cause 2D perspective image 208 to be placed at either a head or tail of data structure 204 (e.g., depending on which side is most efficient), or may cause 2D perspective image 208 to be placed at any other suitable portion of data structure 204, and may remove 2D perspective image 208 from data structure 202.

At 718, upon determining that the same 2D perspective image is the most efficient predictor of the particular 2D perspective image, as well as the most efficiently predicted 2D perspective image, the image data processing system may perform further processing. For example, the image data processing system may further identify, from among the images remaining in data structure 202, the next most efficient predictor of the particular 2D perspective image (or the 2D perspective image that is the next most efficiently predicted by the particular 2D perspective image) aside from 2D perspective image 208, and may cause the identified 2D perspective image to be placed at a head or tail of data structure 204, or at any other suitable location of data structure 204. For example, the image data processing system may identify a next most efficient predictor of the particular 2D perspective image if 2D perspective image 208 is placed within data structure 204 based on being the most efficiently predicted by the particular 2D perspective image, and may place such next most efficient predictor at the other end of data structure 204 (as compared to 2D perspective image 208), or at any other suitable location of data structure 204. On the other hand, the image data processing system may identify a 2D perspective image that is the next most efficiently predicted by the particular 2D perspective image if 2D perspective image 208 is placed within data structure based on being the most efficient predictor of the particular 2D perspective image, and may place such next most efficiently predicted 2D perspective image at the other end of data structure 204 (as compared to 2D perspective image 208), or at any other suitable location of data structure 204.

After the image data processing system performs 714 or 718, processing may return to 704. If the image data processing system determines that further 2D perspective images remain in data structure 202, processing may proceed to 706 and the processing of at least a portion of FIG. 7 may be iteratively repeated until each 2D perspective image is placed at a particular position within data structure 204. If the image data processing system determines that no further 2D perspective images remain in data structure 202, processing may proceed to 720. At 720, which may correspond at least in part to 604 of FIG. 6, the image data processing system may be configured to order the 2D perspective images within the GOP in a particular order based on the order specified in the second data structure (e.g., data structure 204 of FIG. 2). In some embodiments, the image data processing system may perform further processing, such as described in FIG. 3 and FIG. 8, such that the ordering of the 2D perspective images may be determined based at least in part on characteristics of equipment used to capture the image data (e.g., LF image data 100 comprising 2D perspective images 102-132 of FIG. 1A).

FIG. 8 is a flowchart of a detailed illustrative process for determining an ordering of 2D perspective images in a GOP. In various embodiments, the individual steps of process 800 may be implemented by one or more components of the devices and systems of FIGS. 1-5. Although the present disclosure may describe certain steps of process 800 (and of other processes described herein) as being implemented by certain components of the devices and systems of FIGS. 1-5, this is for purposes of illustration only, and it should be understood that other components of the devices and systems of FIGS. 1-5 may implement those steps instead. In addition, one or more steps of process 800 may be incorporated into or combined with one or more steps of any other process or embodiment (e.g., FIG. 6, FIG. 7, or any other embodiment disclosed herein, or any combination thereof).

In some embodiments, any suitable portion of the steps described in FIG. 8 may be used to determine the characteristics associated with equipment used to capture the plurality of 2D perspective images, as described in 604 of FIG. 6. For example, the image data processing system may be configured to perform optimization to configure or pre-configure ordering of the 2D perspective images based on characteristics associated with equipment used to capture 2D perspective images 102-132 of FIG. 1A.

At 802, the image data processing system may retrieve a data structure (e.g., from database 505 of FIG. 5) comprising a plurality of ordering arrangements and corresponding characteristics associated with equipment used to capture image data (e.g., LF image data and/or any other suitable image data for presentation on a 3D display). For example, the data structure may comprise a table indicating historical orderings of 2D perspective images within a GOP that enabled optimizing the encoding of the 2D perspective images for corresponding equipment characteristics. In some embodiments, the characteristics may be a spatial arrangement of the equipment (e.g., which cameras are spatially adjacent or proximate), an angular orientation of the equipment with respect to a captured scene corresponding to LF image data 100, different types or different numbers of equipment or sensors (e.g., a multi-camera array, a camera gantry or a lenslet camera or any other suitable equipment or combination thereof), different capturing systems, different focal lengths, various depth settings, a type or size or shape or other characteristics of an object being captured, any suitable hardware or software limitation pertinent to the equipment used to capture LF image data 100, or any other suitable characteristics or any combination thereof.

At 804, the image data processing system may determine one or more characteristics associated with equipment used to capture the plurality of 2D perspective images (e.g., 2D perspective images 102-132 of FIG. 1A). For example, the characteristics of the equipment may be indicated in metadata of the LF image data 100, specified by an operator of the equipment or other operator, automatically determined based on characteristics of the captured imagery, pre-encoded in LF image data 100 using any suitable technique, and/or otherwise appended to or associated with LF image data 100.

At 806, the image data processing system may compare one or more characteristics stored in association with the data structure retrieved at 802 to one or more characteristics determined at 804. For example, the image data processing system may compute a degree that the characteristics determined at 804 match the stored characteristics, such as, for example, by comparing keywords in a text string corresponding to a type of camera or sensor determined at 804 to the stored types of cameras, and/or by comparing a depth range or distances from a scene determined at 804 to the stored depth range or distances from a scene and determining whether the difference is within a predetermined threshold amount. In some embodiments, the image data processing system may employ machine learning techniques, or any other suitable computer-implemented techniques, to identify a closest match as between the determined characteristic at 804 to the stored characteristics retrieved at 802. In some embodiments, the image data processing system, in performing the comparison, may determine that a same profile associated with the 2D perspective images previously used a particular ordering for a similar equipment configuration, and may apply such particular ordering to the 2D perspective images at issue.

At 808, the image data processing system may determine, based on the comparison at 806, whether the characteristics of the 2D perspective images at issue (e.g., 2D perspective images 102-132 of FIG. 1A) sufficiently match one of the stored sets of configurations. Such determination may be based on whether the computed match score or confidence score for a particular characteristic exceeds a threshold amount, or whether a computed match score or confidence score for a set of characteristics determined at 804 matches a stored set of characteristics. An affirmative determination at 808 may cause processing to proceed to 808. Otherwise, processing may proceed to 804, and/or the image data processing system may rely on the technique described in FIG. 7 to perform the ordering of the 2D perspective images within the GOP.

At 808, the image data processing system may order the plurality of 2D perspective views within the GOP based on an ordering arrangement corresponding to the matched characteristic. For example, the image data processing system may retrieve the stored optimal order and apply the optimal order to the 2D perspective images 102-132. In this way, the image data processing system may be configured to pre-configure the encoding setup with an optimization applied to a known arrangement of micro-sensors or multi-cameras. Such optimization may also provide granularity in the pre-configuration such that a different ordering of the 2D perspective images may be selected for an object captured from a different depth, or different distance from the camera, or from among scenes spanning different ranges of depths. In some embodiments, the aspects of FIG. 8 may be performed together with the aspects of FIGS. 6 and 7, to determine the optimal ordering for the 2D perspective images in the GOP.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
   accessing image data, wherein the image data comprises a plurality of two-dimensional (2D) perspective images that exhibit parallax for presentation on a three-dimensional (3D) display;
   encoding the image data, wherein the encoding comprises:
   generating a group of pictures (GOP) that comprises the plurality of 2D perspective images; and
   ordering the plurality of 2D perspective images within the GOP in a particular order based on a set of evaluated metrics derived from content of the plurality of 2D perspective images by determining a prediction efficiency for each 2D perspective image of the plurality of 2D perspective images, wherein the prediction efficiency corresponds to a degree to which each 2D perspective image is usable to predict characteristics of other 2D perspective images of the plurality of 2D perspective images; and
   transmitting the encoded image data for display.

2. The method of claim 1, wherein the encoded image data is transmitted to a client device configured to decode the encoded image data and generate the decoded image data for display, and
   the particular order of the plurality of 2D perspective images within the GOP enables the image data to be transmitted to the client device in a manner that maximizes visual quality of the displayed decoded image data for a given data rate of transmitting the image data, or the particular order of the plurality of 2D perspective images within the GOP enables the image data image data for a given visual quality of the displayed decoded image data.

3. The method of claim 1, wherein the plurality of 2D perspective images are ordered within the GOP in the particular order based on the set of evaluated metrics derived from content of the plurality of 2D perspective images, and the ordering further comprises:

identifying a first 2D perspective image of the plurality of 2D perspective images, wherein a first data structure comprises the plurality of 2D perspective images;

modifying the first data structure by removing the first 2D perspective image from the first data structure;

determining a second 2D perspective image, of the 2D perspective images included in the modified first data structure, based on which the first 2D perspective image can be encoded using the least amount of data; and generating a second data structure comprising the first 2D perspective image and the second 2D perspective image;

wherein ordering the plurality of 2D perspective images within the GOP is based on the second data structure.

4. The method of claim 3, wherein the ordering further comprises:

determining a third 2D perspective image, of the 2D perspective images included in the modified first data structure, that can be encoded based on the first 2D perspective image using the least amount of data; and generating a second data structure comprising the first 2D perspective image and at least one of the second 2D perspective image or the third 2D perspective image;

wherein ordering the plurality of 2D perspective images within the GOP is based on the second data structure.

5. The method of claim 1, wherein ordering the plurality of 2D perspective images within the GOP in the particular order is further based on equipment characteristics associated with equipment used to capture the plurality of 2D perspective images, and the method further comprises:

ordering the plurality of 2D perspective images within the GOP in the particular order further based at least in part on a first weight and a second weight, wherein the first weight is associated with the prediction efficiencies for each 2D perspective image of the plurality of 2D perspective images and is assigned based at least in part on comparing the prediction efficiencies to a threshold, and wherein the second weight is associated with the equipment characteristics and is assigned based on how closely the equipment characteristics match stored equipment characteristics associated with historical GOP ordering data.

6. The method of claim 5, wherein the equipment characteristics comprise at least one of a spatial arrangement of the equipment used to capture the plurality of 2D perspective images or an angular orientation of the equipment used to capture the plurality of 2D perspective images with respect to a captured scene corresponding to the image data.

7. The method of claim 5, wherein the equipment characteristics comprise a type of the equipment used to capture the plurality of 2D perspective images, and the type of the equipment used to capture the plurality of 2D perspective images comprises a multi-camera array, a camera gantry or a lenslet camera.

8. The method of claim 5, wherein the equipment characteristics comprise a stored depth range corresponding to a depth range from which a scene corresponding to the image data is captured by the equipment used to capture the plurality of 2D perspective images.

9. The method of claim 5, wherein the equipment characteristics comprise a stored distance corresponding to a distance between the equipment used to capture the plurality of 2D perspective images and a captured scene corresponding to the image data.

10. A computer-implemented system, comprising:
input/output (I/O) circuitry; and
control circuitry configured to:
access image data, wherein the image data comprises a plurality of two-dimensional (2D) perspective images that exhibit parallax for presentation on a three-dimensional (3D) display, the image data being received via the I/O circuitry;
encode the image data by:
generating a group of pictures (GOP) that comprises the plurality of 2D perspective images; and
ordering the plurality of 2D perspective images within the GOP in a particular order based on a set of evaluated metrics derived from content of the plurality of 2D perspective images by determining a prediction efficiency for each 2D perspective image of the plurality of 2D perspective images, wherein the prediction efficiency corresponds to a degree to which each 2D perspective image is usable to predict characteristics of other 2D perspective images of the plurality of 2D perspective images; and
transmit the encoded image data for display.

11. The system of claim 10, wherein the control circuitry is configured to transmit the encoded image data to a client device that is configured to decode the encoded image data and generate the decoded image data for display, and
the particular order of the plurality of 2D perspective images within the GOP enables the image data to be transmitted to the client device in a manner that maximizes visual quality of the displayed decoded image data for a given data rate of transmitting the image data, or the particular order of the plurality of 2D perspective images within the GOP enables the image data to be transmitted to the client device in a manner that minimizes a data rate of transmitting the image data for a given visual quality of the displayed decoded image data.

12. The system of claim 10, wherein the plurality of 2D perspective images are ordered within the GOP in the particular order based on the set of evaluated metrics derived from content of the plurality of 2D perspective images, and the control circuitry is further configured to perform the ordering by:
identifying a first 2D perspective image of the plurality of 2D perspective images, wherein a first data structure comprises the plurality of 2D perspective images;
modifying the first data structure by removing the first 2D perspective image from the first data structure;
determining a second 2D perspective image, of the 2D perspective images included in the modified first data structure, based on which the first 2D perspective image can be encoded using the least amount of data; and
generating a second data structure comprising the first 2D perspective image and the second 2D perspective image;

wherein ordering the plurality of 2D perspective images within the GOP is based on the second data structure.

13. The system of claim 12, wherein the control circuitry is further configured to perform the ordering by:

determining a third 2D perspective image, of the 2D perspective images included in the modified first data structure, that can be encoded based on the first 2D perspective image using the least amount of data; and generating a second data structure comprising the first 2D perspective image and at least one of the second 2D perspective image or the third 2D perspective image;

wherein ordering the plurality of 2D perspective images within the GOP is based on the second data structure.

14. The system of claim 10, wherein:

ordering the plurality of 2D perspective images within the GOP in the particular order is further based on equipment characteristics associated with equipment used to capture the plurality of 2D perspective images; and the plurality of 2D perspective images are ordered within the GOP in the particular order based on the equipment characteristics associated with the equipment used to capture the plurality of 2D perspective images, the equipment characteristics comprising at least one of a spatial arrangement of the equipment used to capture the plurality of 2D perspective images or an angular orientation of the equipment used to capture the plurality of 2D perspective images with respect to a captured scene corresponding to the image data.

15. The system of claim 10, wherein:

ordering the plurality of 2D perspective images within the GOP in the particular order is further based on equipment characteristics associated with equipment used to capture the plurality of 2D perspective images; and the equipment characteristics comprise a type of the equipment used to capture the plurality of 2D perspective images, and the type of the equipment used to capture the plurality of 2D perspective images comprises a multi-camera array, a camera gantry or a lenslet camera.

16. The system of claim 10, wherein:

ordering the plurality of 2D perspective images within the GOP in the particular order is further based on equipment characteristics associated with equipment used to capture the plurality of 2D perspective images; and the equipment characteristics comprise a depth range from which a scene corresponding to the image data is captured by the equipment used to capture the plurality of 2D perspective images.

17. The system of claim 10, wherein:

ordering the plurality of 2D perspective images within the GOP in the particular order is further based on equipment characteristics associated with equipment used to capture the plurality of 2D perspective images; and the equipment characteristics comprise a distance between the equipment used to capture the plurality of 2D perspective images and a captured scene corresponding to the image data.

18. The system of claim 10, wherein ordering the plurality of 2D perspective images within the GOP in the particular order is further based on equipment characteristics associated with equipment used to capture the plurality of 2D perspective images, and the control circuitry is further configured to store a plurality of ordering arrangements and corresponding equipment characteristics associated with the equipment used to capture the plurality of 2D perspective images; and wherein the plurality of 2D perspective images are ordered within the GOP in the particular order based on the characteristics associated with the equipment used to capture the plurality of 2D perspective images, and the control circuitry is further configured to perform the ordering by:

determining the equipment characteristic;

matching the determined equipment characteristic to a stored equipment characteristic; and ordering the plurality of 2D perspective images based on an ordering arrangement corresponding to the stored equipment characteristic, wherein the ordering arrangement corresponds to the particular order.

19. The system of claim 10, wherein the control circuitry is further configured to:

order the plurality of 2D perspective images within the GOP in the particular order further based on equipment characteristics associated with equipment used to capture the plurality of 2D perspective images; and order the plurality of 2D perspective images within the GOP in the particular order further based at least in part on a first weight and a second weight, wherein the first weight is associated with the prediction efficiencies for each 2D perspective image of the plurality of 2D perspective images and is assigned based at least in part on comparing the prediction efficiencies to a threshold, and wherein the second weight is associated with the equipment characteristics and is assigned based on how closely the equipment characteristics match stored equipment characteristics associated with historical GOP ordering data.

* * * * *